(12) United States Patent
Doron

(10) Patent No.: US 10,601,889 B1
(45) Date of Patent: *Mar. 24, 2020

(54) BROADCASTING PANORAMIC VIDEOS FROM ONE SERVER TO MULTIPLE ENDPOINTS

(71) Applicant: Ambarella International LP, Santa Clara, CA (US)

(72) Inventor: Moshe Doron, San Francisco, CA (US)

(73) Assignee: Ambarella International LP, Santa Clara, CA (US)

( * ) Notice: Subject to any disclaimer, the term of this patent is extended or adjusted under 35 U.S.C. 154(b) by 222 days.

This patent is subject to a terminal disclaimer.

(21) Appl. No.: 15/332,190

(22) Filed: Oct. 24, 2016

Related U.S. Application Data

(63) Continuation-in-part of application No. 15/297,455, filed on Oct. 19, 2016, which is a continuation-in-part of application No. 15/092,071, filed on Apr. 6, 2016.

(51) Int. Cl.
*H04N 7/12* (2006.01)
*H04L 29/06* (2006.01)

(52) U.S. Cl.
CPC ........ *H04L 65/607* (2013.01); *H04L 65/4069* (2013.01)

(58) Field of Classification Search
CPC ......... H04N 5/23238; H04N 21/21805; H04N 13/194; H04N 13/243; H04N 21/4728; H04N 13/111; H04N 21/47; H04N 21/47202; H04N 21/4852; H04N 21/4854; H04N 21/6587; H04N 21/8106; H04N 21/816; H04N 5/144; H04N 5/2252; H04N 5/2259; H04N 5/232; H04N 5/23261; H04N 5/23293; H04N 5/247; H04N 5/2628; H04N 5/272; H04N 5/44
USPC .......................................................... 348/240
See application file for complete search history.

(56) References Cited

U.S. PATENT DOCUMENTS 9,781,356 B1 * 10/2017 Banta .................... H04N 5/2628
2016/0050368 A1 * 2/2016 Seo ............................ G06T 7/11
348/36
2016/0277772 A1 * 9/2016 Campbell ........ H04N 21/21805
2017/0111678 A1 * 4/2017 Hwang ..................... H04N 5/44

FOREIGN PATENT DOCUMENTS

WO WO-2015155406 A1 * 10/2015 ............. G03B 37/04

* cited by examiner

*Primary Examiner* — Masum Billah
(74) *Attorney, Agent, or Firm* — Christopher P. Maiorana, PC

(57) ABSTRACT

An apparatus comprising an interface and a processor. The interface may (a) receive a panoramic video, (b) present a plurality of encoded target areas to a network and (c) present a downscaled panoramic video to the network. The processor may (a) generate target areas by cropping sections of the panoramic video, (b) encode each of the target areas using first parameters and (c) use second parameters to encode the downscaled panoramic video. Encoding using the first parameters generates a different bitrate than using the second parameters. The target areas cover an entire field of view of the panoramic video. Each of the target areas covers a different position of the panoramic video. The network presents one of the encoded target areas to a playback device corresponding to a region of interest of the playback device. The network presents the downscaled panoramic video to each playback device.

14 Claims, 12 Drawing Sheets

BROADCASTING PANORAMIC VIDEOS FROM ONE SERVER TO MULTIPLE ENDPOINTS

This application relates to U.S. Ser. No. 15/297,455, filed Oct. 19, 2016, which relates to U.S. Ser. No. 15/092,071, filed Apr. 6, 2016. Each of the mentioned applications are hereby incorporated by reference in their entirety.

FIELD OF THE INVENTION

The invention relates to video encoding generally and, more particularly, to a method and/or apparatus for broadcasting panoramic videos from one server to multiple endpoints.

BACKGROUND

Panoramic video typically involves high resolution footage to capture a large field of view (FOV) (i.e., an entire 360 degree field of view). Streaming panoramic video involves a high bitrate data transfer. Typical networks, like the Internet, have limited streaming bandwidth. Cellular or wireless networks also typically have limited bandwidth. Streaming high bitrate video over 3G/4G/LTE networks consumes a large amount of data. In conventional panoramic video playback, on the display side, the user sees only a small part of the panoramic image at one time. The small part of the panoramic image that the user sees is called a region of interest (ROI).

Conventional panoramic video playback typically streams the entire panoramic field of view (i.e., a 360 degree field of view). Streaming the entire panoramic field of view allows the region of interest to be changed in response to the user moving his or her head. A change in region of interest needs to happen quickly (typically <20 ms) to avoid a noticeable delay on the display side. Longer delays tend to provide a poor user experience, and in many cases trigger a sickness feeling.

Streaming video is becoming increasingly popular (i.e., video on demand). For video on demand, a central server provides content to multiple viewers. Generating panoramic video involves a large amount of processing. For video on demand with panoramic video there is an issue of the region of interest each user is viewing in addition to the timing issue of each video frame. Video on demand for panoramic video can overwhelm processing and bandwidth capabilities of a central server.

It would be desirable to implement broadcasting panoramic videos from one server to multiple endpoints.

SUMMARY

The invention concerns an apparatus comprising an interface and a processor. The interface may be configured to (a) receive a panoramic video stream, (b) present a plurality of encoded target areas to a content delivery network and (c) present a downscaled panoramic video stream to the content delivery network. The processor may be configured to (a) generate a plurality of target areas by cropping sections of the panoramic video stream received from the interface, (b) encode each of the target areas using first parameters, (c) use second parameters to encode the panoramic video stream to generate the downscaled panoramic video stream and (d) present the encoded target areas and the downscaled panoramic video stream to the interface. Encoding using the first parameters generates a different bitrate than using the second parameters. The plurality of target areas cover an entire field of view of the panoramic video stream. Each of the plurality of target areas covers a different position of the panoramic video stream. The content delivery network presents one of the encoded target areas to a playback device corresponding to a region of interest of the playback device. The content delivery network presents the downscaled panoramic video to each of a plurality of playback devices.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing (i) panoramic video that may broadcast from one server to multiple endpoints, (ii) support for live streaming over high latency and/or low bandwidth network, (iii) a panoramic video stream with a high bitrate portion and a low bitrate portion, (iv) a dynamic update of a panoramic video stream, (v) an improved streaming efficiency that limits a negative impact to the end user, (vi) a portion of a panoramic video viewed by a user with compression that has less lossiness than a compression used for remaining portions of the panoramic video, (vii) a downscaled, full field of view of a panoramic video and a cropped high quality target area streamed together, (viii) cropped target areas that cover the entire field of view of the panoramic video, (ix) a target area based on a point of view of an end user and/or (x) a system that may be implemented as one or more integrated circuits.

Figure 1:
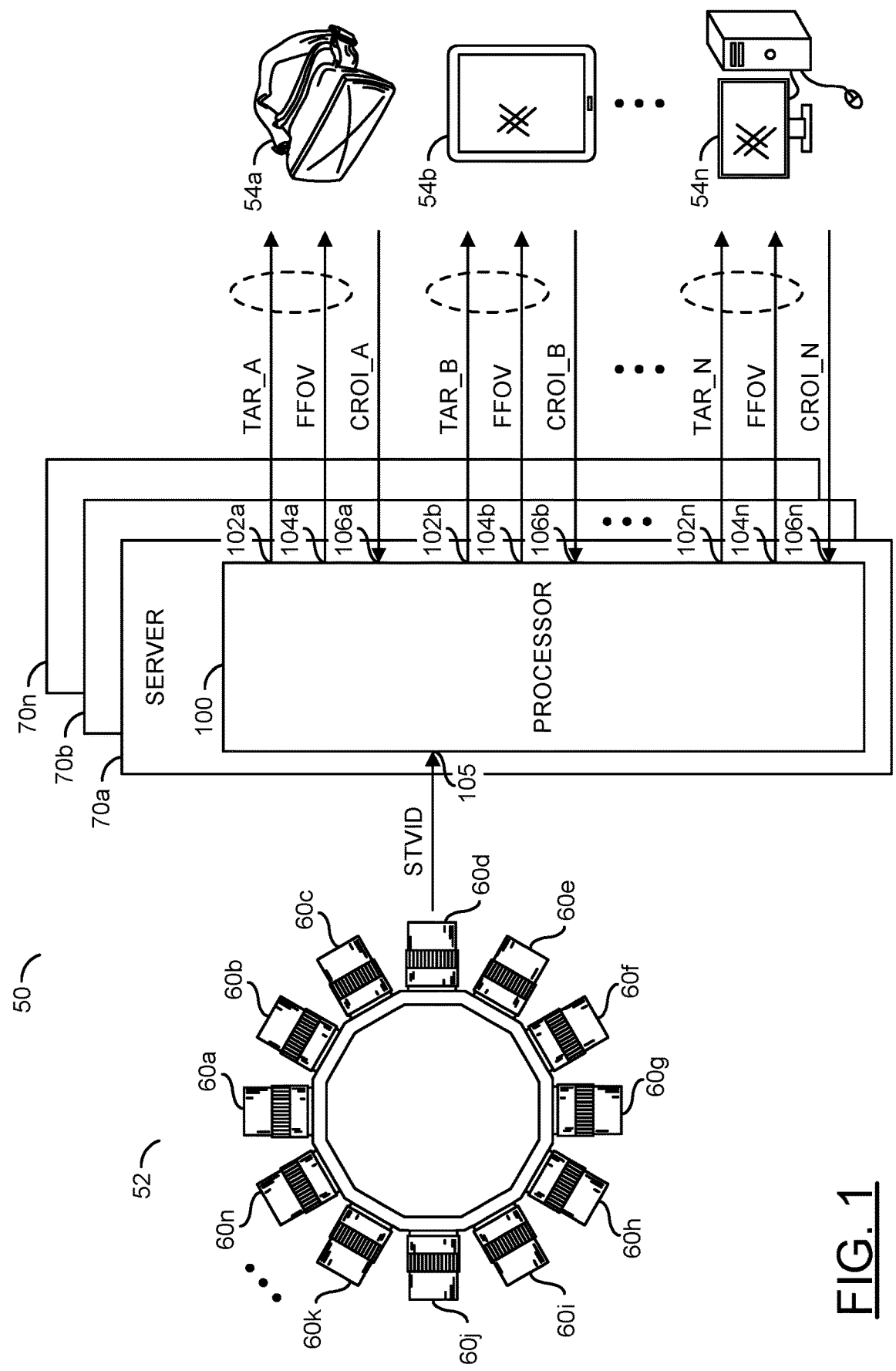
FIG. 1 is a diagram illustrating an embodiment of the invention.

Referring to FIG. 1, a diagram of a system 50 illustrating an embodiment of the invention is shown. The system 50 may comprise a device 52, devices 70a-70n and/or endpoints 54a-54n. The system 50 may comprise additional components. The device 52 may be a panoramic camera. The devices 70a-70n may be network infrastructure. In an example, the devices 70a-70n may be server computers. The endpoints 54a-54n may be playback devices. The server 70a is shown comprising a block (or circuit or apparatus) 100. In an example, the apparatus 100 may be a processor with an interface for input/output. In another example, the apparatus 100 may be a system on chip (SoC).

The system 50 shows the apparatus 100 implemented on the server 70a. In some embodiments, each of the servers 70a-70n may implement the apparatus 100. In an example, the servers 70a-70n may be implemented as a group of cloud-based, scalable servers. By implementing a number of scalable servers 70a-70n, the apparatus 100 may have additional resources (e.g., power, processing capability, memory, etc.) available to process variable amounts of data from the camera 52. For example, the servers 70a-70n may be configured to scale (e.g., provision resources) based on demand. The servers 70a-70n may implement scalable computing (e.g., cloud computing). The scalable computing may be available as a service to allow users to have access to processing resources without having to build their own infrastructure.

The system 50 may be connected as a network. In some embodiments, the camera 52 may connect to a central server (e.g., the servers 70a-70n may be a portion of the central server). In some embodiments, the servers 70a-70n may send and/or receive data to one or more endpoints. In an example, the playback devices 54a-54n may be the endpoints.

The camera 52 may be configured to capture a panoramic field of view. In one example, the panoramic field of view may allow an end user to view a video of the environment surrounding the camera 52 (e.g., a live stream). In another example, the panoramic field of view may allow the end user to view a previously recorded video of the environment surrounding the camera 52. The playback devices 54a-54n may each be configured to display the panoramic field of view to the end user.

The camera 52 may be implemented as a panoramic field of view camera (e.g., a camera configured to record panoramic video, spherical video, a 360 degree video and/or less than a 360 degree video, etc.). In some embodiments, the camera 52 may be implemented as a multi-sensor camera. In some embodiments, the camera 52 may be implemented having one or more wide angle (or fisheye) lenses. The implementation of the camera 52 may be varied according to the design criteria of a particular implementation.

Generally, the panoramic video may comprise a large field of view generated by one or more lenses/camera sensors. One example of a panoramic video may be an equirectangular 360 video. Equirectangular 360 video may also be called spherical panoramas. Panoramic video may be a video that provides a field of view that is larger than the field of view that may be displayed on a device used to playback the video (e.g., the playback devices 54a-54n). In some embodiments, portions of the panoramic video may be cropped to the size of the display of one or more of the playback devices 54a-54n (e.g., portions of the panoramic video outside of the cropped portion may be discarded and/or not displayed). In some embodiments, the panoramic video may be panned in one or more directions to see additional portions of the panoramic video outside of the field of view of one or more of the playback devices 54a-54n. For example, the panoramic video may comprise a spherical video, a hemispherical video, a 360 degree video, a wide angle video, a video having less than a 360 field of view, etc.

Panoramic videos may comprise a view of the environment near the camera 52. In one example, the entire field of view of the panoramic video may be captured at generally the same time (e.g., each portion of the panoramic video represents the view from the camera 52 at one particular moment in time). In some embodiments (e.g., when the camera 52 implements a rolling shutter sensor), a small amount of time difference may be present between some portions of the panoramic video. Generally, each video frame of the panoramic video comprises one exposure of the sensor (or multiple sensors) capturing the environment near the camera 52.

In some embodiments, the panoramic video may provide coverage for a full 360 degree field of view. In some embodiments, less than a 360 degree view may be captured by the panoramic video (e.g., a 270 degree field of view, a 180 degree field of view, etc.). In some embodiments, the panoramic video may comprise a spherical field of view (e.g., capture video above and below the camera 52). In some embodiments, the panoramic video may comprise a field of view that is less than a spherical field of view (e.g., the camera 52 may be configured to capture the ground below and the areas to the sides of the camera 58 but nothing directly above). The implementation of the panoramic video may be varied according to the design criteria of a particular implementation.

The camera 52 generally comprises a number of capture devices 60a-60n. Each of the capture devices 60a-60n may be implemented as a sensor, a standalone camera, or other video capture device. Each of the capture devices 60a-60n is shown pointing in a corresponding direction. By capturing each of the directions, the camera 52 may capture a panoramic view of the environment surrounding the camera 52. In the embodiment shown, the directions captured by the capture devices 60a-60n may surround the camera 52. However, the capture devices 60a-60n may be configured to capture fields of view above and/or below a level of the camera 52.

The playback devices 54a-54n are shown as various types of devices. The playback devices 54a-54n may be implemented as a display, a wearable headset, a tablet computing device, a smartphone, a desktop computer, a laptop computer, a media device, a television and/or other panoramic video viewing devices. Each of the playback devices 54a-54n may be worn (or viewed) by a user. The playback devices 54a-54n may be configured to display video frames (e.g., panoramic video frames) of the panoramic video. The playback devices 54a-54n may present a portion of each of the panoramic video frames in response to coordinates that correspond to a direction the user is looking. The portion of each of the panoramic video frames that is displayed may be a region of interest (ROI). The region of interest may represent a field of view watched by a user of one of the playback devices 54a-54n. For example, the playback devices 54a-54n may receive the panoramic video frames and refresh the output to show only the region of interest. The region of interest may correspond to the size of the viewport of the playback devices 54a-54n.

The camera 52 is shown sending a signal (e.g., STVID) to the apparatus 100. The signal STVID may be a video signal derived from the capture devices 60a-60n. In an example, the signal STVID may be stitched from two or more of the capture devices 60a-60n. In another example, the signal STVID may be de-warped from a distorted video captured by a wide angle lens. In some embodiments, the signal STVID may be encoded at the full bitrate of the capture devices 60a-60n. In some embodiments, signal STVID may be raw video data (e.g., uncompressed video data). For example, the signal STVID may be sent using a high bit-rate link (e.g., a content delivery network backhaul). In another example, the raw video data may be video frames captured by each of the capture devices 60a-60n (e.g., unstitched video) and the apparatus 100 may perform video stitching operations to generate the panoramic field of view. The video data transmitted by the camera 52 to the apparatus 100 may be varied according to the design criteria of a particular implementation.

In some embodiments, the apparatus 100 may generate the panoramic video based on the signal STVID. The apparatus 100 may generate the panoramic video having varying regions encoded at different bitrates (or amounts of lossiness). The apparatus 100 may encode the panoramic video for transmission to the playback devices 54a-54n. In some embodiments, the panoramic video may be transmitted to the playback devices 54a-54n using a low-rate link. In one example, the low-rate link may be a wireless connection. In another example, the low-rate link may be a congested network. In yet another example, the low-rate link may be a link that may be saturated by the signal STVID.

In some embodiments, the apparatus 100 may be implemented as a printed circuit board comprising one or more components. The apparatus 100 may be configured to encode video frames captured by each of the capture devices 60a-60n. In some embodiments, the apparatus 100 may be configured to perform video stitching operations to stitch video frames captured by each of the capture devices 60a-60n to generate the panoramic field of view (e.g., the panoramic video frames).

The apparatus 100 may be configured to generate signals (e.g., TAR_A-TAR_N) and a signal (e.g., FFOV). The apparatus 100 may be configured to receive signals (e.g., CROI_A-CROI_N). The apparatus 100 is shown communicating with the playback devices 54a-54n. The apparatus 100 may present one of the signals TAR_A-TAR_N to each of the playback devices 54a-54n. The apparatus 100 may present the signal FFOV to each of the playback devices 54a-54n. Each of the playback devices 54a-54n may present one of the signals CROI_A-CROI_N to the apparatus 100.

In some embodiments, the servers 70a-70n may be configured to stream the panoramic video to the playback devices 54a-54n (e.g., for live playback). For example, the servers 70a-70n may connect to the camera 52 using a high-rate link to receive the signal STVID. The apparatus 100 may perform operations to stitch, crop, downscale, encode, de-warp and/or transcode the panoramic video in real-time (or near real-time). For example, the signal STVID may be a full (e.g., uncompressed), high-quality stream of the panoramic video from the camera 52 to the servers 70a-70n. The apparatus 100 may generate an encoded version of the panoramic video. In some embodiments, the encoded version of the panoramic video may have at least two sections with different qualities. The two sections may be streamed from the servers 70a-70n to the playback devices 54a-54n. In some embodiments, the encoded version of the panoramic video may comprise one or more signals (e.g., the signals TAR_A-TAR_N and/or the signal FFOV) to be streamed to the playback devices 54a-54n.

In some embodiments, the servers 70a-70n may implement a content delivery network. Each of the servers 70a-70n may be a node in the content delivery network. In an example, the processor 100 may present the signals TAR_A-TAR_N and/or FFOV to the content delivery network 70a-70n. Similarly, the camera 52 may present the signal STVID to the content delivery network 70a-70n and/or the playback devices 54a-54n may present the signals CROI_A-CROI_N to the content delivery network 70a-70n. The content delivery network 70a-70n may comprise various server computers, storage devices, switches, hubs, repeaters, routers and/or other data transmission devices.

The content delivery network 70a-70n may be configured to transfer data to/from various locations. For example, the processor 100 may generate panoramic video content and the content delivery network 70a-70n may spread the panoramic video content throughout a network to deliver the panoramic video content to the endpoints 54a-54n. Some of the servers 70a-70n may be located physically closer to the endpoints 54a-54n to provide a faster transmission of data. In some embodiments, nodes that are closer to the endpoints 54a-54n may have less data transmission capacity (e.g., the connection to the endpoints 54a-54n may be a high latency and/or low bandwidth network). Caching and/or buffering may be implemented to provide fast access to data. Data may propagate from nodes nearby the device generating data to other nodes in the content delivery network 70a-70n. For example, the playback device 54a may present the signal CROI_A to an edge node 70i (e.g., the server 70i may provide the fastest connection to the content delivery network for the playback device 54a) and the edge node 70i may transmit the signal CROI_A to other servers in the content delivery network 70a-70n.

In some embodiments, the servers 70a-70n may be configured to receive the signal STVID from the camera 52 and transfer the panoramic video to the playback devices 54a-54n for playback at a later time. For example, the signal STVID may be uploaded to the content delivery network 70a-70n (e.g., via an internet connection, or locally from a storage device such as a USB drive, an external memory card, a hard drive, a flash drive, etc.). The signal STVID may be stored by the servers 70a-70n until requested by one or more of the playback devices 54a-54n (e.g., not streamed live). The apparatus 100 may be configured to stitch, crop, downscale, de-warp, encode and/or transcode the signal STVID and store the result.

For example, the content delivery network 70a-70n may store the source signal STVID (e.g., the full, high quality video version of the captured environment), and one or more versions of the signal STVID may be stitched, cropped, downscaled, encoded and/or transcoded by the apparatus 100 (e.g., various lower-quality versions of the full field of view of the signal STVID and/or high quality portions of the signal STVID). The apparatus 100 may transfer the stored signals TAR_A-TAR_N and/or the signal FFOV comprising the high quality portion (e.g., section) for the region of interest and the lower-quality version of the entire panoramic video (e.g., to be used for areas outside the region of interest) based on information from the signals CROI_A-CROI_N from the playback devices 54a-54n. The apparatus 100 may stream one video signal comprising a target area (e.g., one of the signals TAR_A-TAR_N having a field of view window slightly larger than the region of interest) having a high quality and another video stream comprising the entire panoramic video stream having a low quality (e.g., the signal FFOV to be used for areas outside the region of interest) over the content delivery network 70a-70n. The playback devices 54a-54n may combine the streams for playback.

In some embodiments, where the camera 52 is used in a video streaming application, the camera 52 may generate the signal STVID to be transcoded, stitched, cropped and/or downscaled by the apparatus 100 on the servers 70a-70n for the playback devices 54a-54n. In some embodiments, the camera 52 may be configured to generate the full quality panoramic source video STVID. The video STVID may be kept for storage. For example, the camera 52 may be connected to a storage device such as a flash storage card. The apparatus 100 may encode the signal STVID to generate the panoramic video signal at a later time.

The apparatus 100 may comprise outputs 102a-102n, outputs 104a-104n, an input 105 and/or inputs 106a-106n. The outputs 102a-102n, outputs 104a-104n, input 105 and/or inputs 106a-106n may comprise an interface for the apparatus 100. In an example, the outputs 102a-102n may present the signals TAR_A-TAR_N to the content delivery network 70a-70n. In another example, the outputs 104a-104n may transmit the signal FFOV to the content delivery network 70a-70n. In yet another example, the input 105 may receive the signal STVID from the camera 52. In still another example, the inputs 106a-106n may receive the signals CROI_A-CROI_N from the content delivery network 70a-70n. In some embodiments, the outputs 104a-104n may be a single output (e.g., the output 104) configured to present the signal FFOV.

The signals TAR_A-TAR_N may be target areas encoded having a high visual quality. The apparatus 100 may be configured to crop the signals TAR_A-TAR_N from the panoramic video signal STVID (or a stitched version of the panoramic video STVID generated by the apparatus 100). The signals TAR_A-TAR_N may be configured to cover an entire field of view of the panoramic video. Each of the target areas TAR_A-TAR_N may be made available on the content delivery network 70a-70n. The playback devices 54a-54n may be configured to select an appropriate one of the target areas TAR_A-TAR_N (e.g., a best match based on the current region of interest). Generally, the target areas TAR_A-TAR_N may be generated to cover the entire field of view of the panoramic video, regardless of the regions of interest of the playback devices 54a-54n. Each playback device 54a-54n may send a request (e.g., the signals CROI_A-CROI_N) to the content delivery network 70a-70n and the content delivery network 70a-70n may transfer the best match from the target areas TAR_A-TAR_N. N. The signal FFOV may be presented to each of the playback devices 54a-54n by the content delivery network 70a-70n regardless of which of the target areas TAR_A-TAR_N is selected for any of the playback devices 54a-54n.

The capture devices 54a-54n may each be configured to transmit one of the signals CROI_A-CROI_N to the apparatus 100 (or the servers 70a-70n). The signals CROI_A-CROI_N may be coordinate signals that may contain information relating to the direction the user is looking (e.g., the region of interest). The capture devices 54a-54n may generate the signals CROI_A-CROI_N in response to the region of interest displayed to the user. The signal CROI_A-CROI_N may also comprise information about a playback capability of the playback devices 54a-54n (e.g., playback resolution, size of the viewport, aspect ratio, supported decoders, etc.). In an example, the playback devices 54a-54n may transmit the signals CROI_A-CROI_N over the network. In one example, the network may be implemented using a wired connection. In another example, the network may be implemented using a wireless connection (e.g., Wi-Fi, Bluetooth, ZigBee, radio frequency, etc.). The signals CROI_A-CROI_N may correspond to a field of view currently visible on the playback devices 54a-54n.

The apparatus 100 may receive the signals CROI_A-CROI_N at the inputs 106a-106n. The panoramic video may have a number of regions (or windows) that may each be encoded at a different bitrate and/or amount of compression (to be described in more detail in connection with FIG. 5 and FIG. 6). In some embodiments, the signals CROI_A-CROI_N may be used by the apparatus 100 to adjust the encoding of the panoramic video. The apparatus 100 may be configured to encode a window slightly larger than the region of interest displayed to the user using a high quality compression (e.g., high bitrate and/or less lossiness). In some embodiments, the apparatus 100 may generate the signals TAR_A-TAR_N regardless of the region of interest data CROI_A-CROI_N.

The portion (or section) of the panoramic video encoded using the high quality compression may be transmitted to the playback devices 54a-54n via the content delivery network 70a-70n as the signals TAR_A-TAR_N. In some embodiments, the apparatus 100 may be configured to encode a remaining area of the panoramic video in a lower quality compression (e.g., low bitrate and/or more lossiness). In some embodiments, the apparatus 100 may be configured to encode a full field of view of the panoramic video in a lower quality compression (e.g., low bitrate and/or more lossiness). The full field of view having the lower quality compression may be presented to the playback devices 54a-54n as the signal FFOV. In an example, the signal FFOV may be a downscaled version of the panoramic video. The size of the windows and/or the quality of the compression may be varied according to the design criteria of a particular implementation.

Generally, the high quality compression provides a version of the panoramic video (or portions of the video) captured by the camera 52 that has less lossiness and/or higher visual quality than the lower quality compression. For example, the image quality of the high quality compression may be greater than the image quality of the lower quality compression. In some embodiments, a number of quantization parameters used for compression may be reduced for the lower quality compression.

Various factors may correspond to the type of compression. One factor may be a bitrate of the compression. In an example, the higher quality compression may have a higher bitrate (e.g., which may need a higher bitrate link to transfer over a network) than the lower quality compression. In another example, the lower quality compression may be a black (or blank) video. Generally, a higher bitrate and/or higher quality compression may correspond to a better visual quality (e.g., video may appear more realistic when viewed, have fewer visual artifacts, have more visual detail, etc.). Another factor may be an amount of processing to encode and/or decode the compression.

In an example, more time and/or power may be consumed by the apparatus 100 to generate one type of encoding (e.g., using H.265 encoding) than another type of encoding (e.g., using H.264 encoding). Similarly, more time and/or power may be consumed by the playback devices 54a-54n to decode the higher quality compression at a lower bitrate than the lower quality compression at a higher bitrate. In another example, a factor may be the specifications of the playback devices 54a-54n (e.g., playback resolution, size of the viewport, aspect ratio, supported decoders, etc.) provided in the signals CROI_A-CROI_N. In some embodiments, a variable bitrate may be used for the high quality and/or the lower quality compression. The bitrate, lossiness and/or processing used for the compression may be varied according to the design criteria of a particular implementation.

The apparatus 100 may transfer the panoramic video comprising the high quality portion for the region of interest (e.g., the signals TAR_A-TAR_N) and the lower-quality version of the entire panoramic video (e.g., the signal FFOV to be used for areas outside the region of interest) based on information from the signals CROI_A-CROI_N received from the playback devices 54a-54n. The apparatus 100 may stream one or more video signals TAR_A-TAR_N comprising the target area (e.g., the window slightly larger than the region of interest) having a high quality and another video stream FFOV comprising the entire panoramic video stream having a low quality (e.g., to be used for areas outside the region of interest). The playback devices 54a-54n may combine the streams for playback.

Encoding the signals TAR_A-TAR_N and/or the signal FFOV may be performed with various parameters to generate different bitrates. For example, a video encoded using one set of parameters may result in an encoded video having one bitrate (e.g., higher) and the same video encoded using another set of parameters may result in an encoded video having a different bitrate (e.g., lower). For example, one set of parameters may be used by the apparatus 100 to encode the target areas of the upcoming video frames of the panoramic video (e.g., the signals TAR_A-TAR_N) and another set of parameters may be used by the apparatus 100 to encode the full field of view of the upcoming video frames of the panoramic video (e.g., the signal FFOV). Various parameters may be implemented.

Encoding using parameters that result in a lower bitrate may result in a compression of the panoramic video (or a portion of the panoramic video) that may reduce bandwidth consumption when transmitting the encoded panoramic video streams TAR_A-TAR_N and/or the panoramic video stream FFOV. In one example, the parameters may be quantization parameters. In another example, the parameters may be a rate factor, deinterlacing, a constant bitrate, a variable bitrate, filters, video codecs, frame rate, a file container, etc. The types of parameters may be varied according to the design criteria of a particular implementation.

Figure 2:
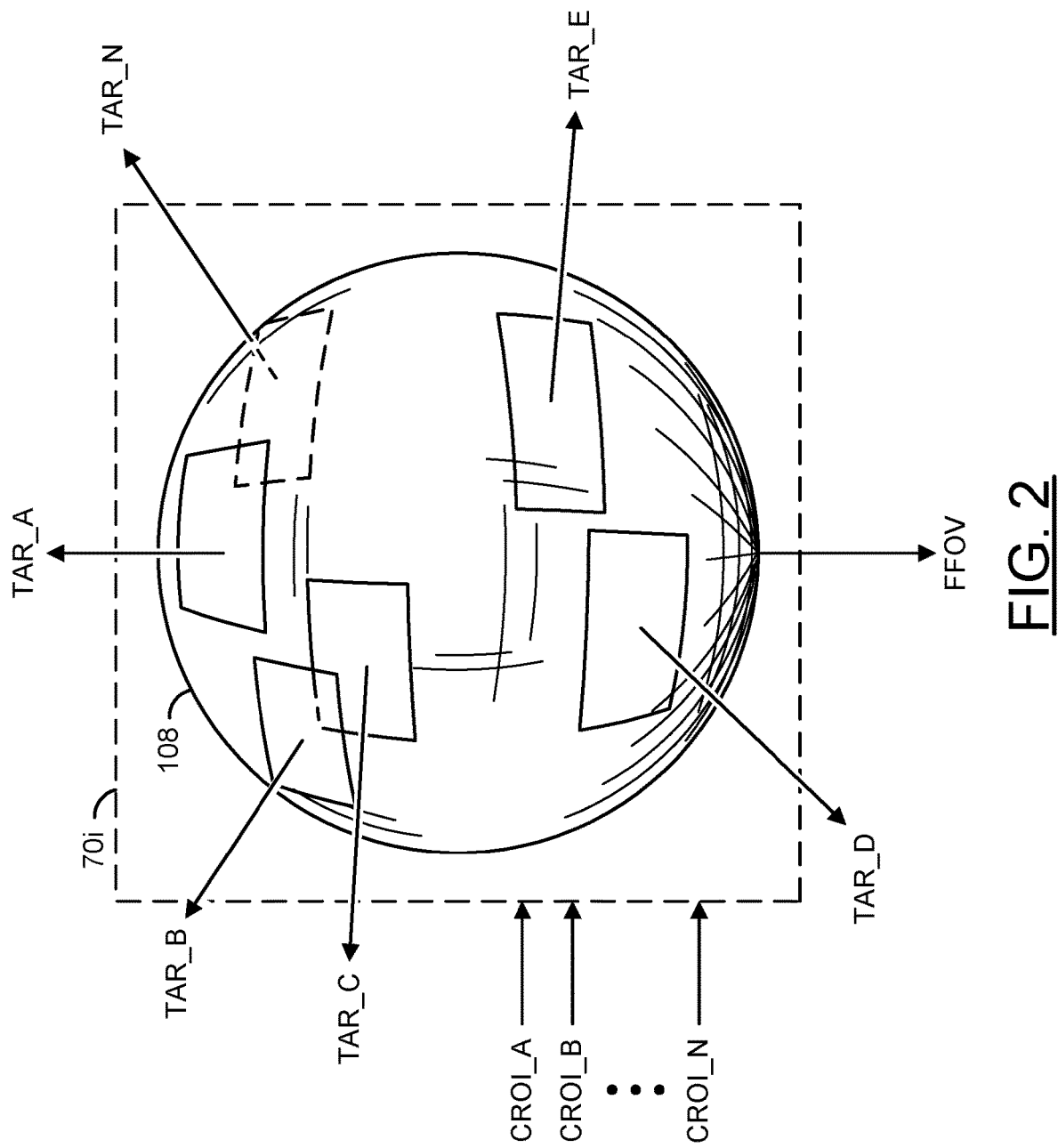
FIG. 2 is a diagram illustrating target areas generated from a panoramic video generated in response to region of interest data.

Referring to FIG. 2, a diagram illustrating target areas TAR_A-TAR_N generated from a panoramic video in response to region of interest data is shown. A panoramic video 108 is shown. The panoramic video 108 may be stored on the server 70i. The server 70i may be configured to receive the signals CROI_A-CROI_N. The server 70i may be configured to distribute the signals TAR_A-TAR_N and/or the signal FFOV. The apparatus 100 may receive the signals CROI_A-CROI_N from the server 70i. The apparatus 100 may process (e.g., crop, encode, stitch, transcode, synchronize, de-warp, etc.) the panoramic video stream 108. The apparatus 100 may generate the signals TAR_A-TAR_N in response to the signals CROI_A-CROI_N. The apparatus 100 may generate the signal FFOV. The apparatus 100 may present the signals TAR_A-TAR_N and/or the signal FFOV to the server 70i (e.g., using the interface outputs 102a-102n and/or 104a-104n).

Example target areas TAR_A-TAR_N are shown on the panoramic video 108. The size of the target areas TAR_A-TAR_N may correspond to a size of a field of view (or viewport) of the playback devices 54a-54n. Generally, the size of the target areas TAR_A-TAR_N is larger than the field of view of the playback devices 54a-54n (e.g., to provide a buffer area for higher visual quality to account for small amounts of head movement by the user). In an example, the viewport may be 1920×1080 pixels and the target areas TAR_A-TAR_N may be larger than 1920×1080.

In some embodiments, the apparatus 100 may generate the target areas TAR_A-TAR_N in response to the region of interest data CROI_A-CROI_N. The target areas TAR_A-TAR_N may be generated on-the-fly. In an example, the apparatus 100 may receive the signal CROI_A and generate the signal TAR_A in response to the signal CROI_A for the playback device 54a. In some embodiments, if no region of interest data CROI_A-CROI_N is received, the apparatus 100 may not generate the target areas TAR_A-TAR_N.

In some embodiments, the target areas TAR_A-TAR_N may correspond to the region of interest data CROI_A-CROI_N received. A center point of the target areas TAR_A-TAR_N may correspond to a center point of the regions of interest CROI_A-CROI_N. The target areas generated may be close to one another and/or overlap each other. In the example shown, the target area TAR_B and the target area TAR_C partially overlap. In the example shown, the target area TAR_A may not overlap with the target area TAR_N (e.g., the target area TAR_A may be on a front-facing side of the panoramic video 108 and the target area TAR_N may be on a back side of the panoramic video 108).

The signal FFOV may be generated for each frame of the panoramic video 108. The signal FFOV may be transmitted in response to the region of interest data CROI_A-CROI_N. For example, the signal FFOV may be transmitted along with the target area TAR_A in response to the request CROI_A. In some embodiments, when no target areas are generated, the signal FFOV may not be generated. Generating the signals TAR_A-TAR_N and/or the signal FFOV in response to the signals CROI_A-CROI_N may reduce bandwidth used in the content delivery network 70a-70n and/or reduce processing by the apparatus 100.

Figure 3:
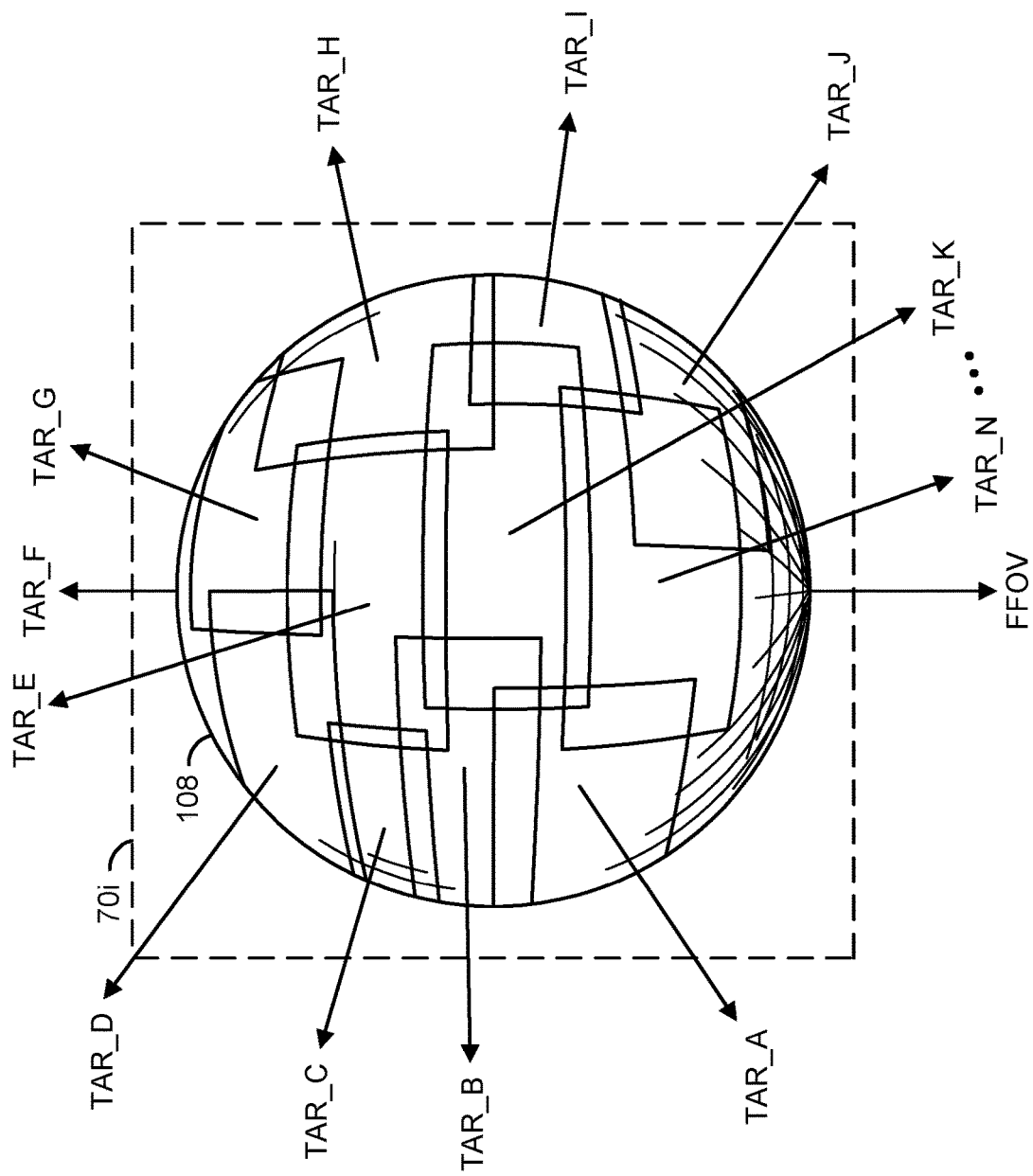
FIG. 3 is a diagram illustrating target areas generated to cover a full field of view of a panoramic video.

Referring to FIG. 3, a diagram illustrating target areas generated to cover a full field of view of a panoramic video is shown. The panoramic video 108 is shown. The panoramic video 108 may be stored on the server 70i. The server 70i may be configured to distribute the signals TAR_A-TAR_N and/or the signal FFOV. The apparatus 100 may process (e.g., crop, encode, stitch, transcode, synchronize, de-warp, etc.) the panoramic video stream 108. The apparatus 100 may generate the signals TAR_A-TAR_N for each video frame of the panoramic video 108. The target areas TAR_A-TAR_N may be cropped to cover the entire field of view of the panoramic video 108. The apparatus 100 may generate the signal FFOV. The apparatus 100 may present the signals TAR_A-TAR_N and/or the signal FFOV to the server 70i (e.g., using the interface outputs 102a-102n and/or 104a-104n).

In some embodiments, the apparatus 100 may be configured to split the field of view of the panoramic video 108 into a number of pre-defined crops (e.g., the target areas TAR_A-TAR_N). The apparatus 100 may broadcast each of the target areas TAR_A-TAR_N in addition to the FFOV to the content delivery network 70a-70n and/or the multiple endpoints 54a-54n. The apparatus 100 may split the field of view of the panoramic video 108 into sections to cover the entire field of view of the panoramic video 108. In an example, when each of the target areas TAR_A-TAR_N are combined, at least the full field of view of the panoramic video 108 may be available (e.g., there may be additional overlapping areas).

In some embodiments, the apparatus 100 may crop the target areas TAR_A-TAR_N into pre-defined sections of the panoramic video 108. For example, for each frame of the panoramic video 108, each of the target areas TAR_A-TAR_N may correspond to the same position (e.g., coordinates) on the panoramic video 108. In some embodiments, the apparatus 100 may crop the target areas TAR_A-TAR_N at different positions for each frame of the panoramic video 108. In an example, the apparatus 100 may be configured to perform video analysis of each video frame of the panoramic video 108 to detect objects. The target areas TAR_A-TAR_N may be cropped to follow one or more of the detected objects. The method for determining the arrangement of the cropping for the target areas TAR_A-TAR_N may be varied according to the design criteria of a particular implementation.

The apparatus 100 may crop the target areas TAR_A-TAR_N to cover the entire field of view of the panoramic video 108. In an example, each of the target areas TAR_A-TAR_N may be sized to cover approximately ⅙ of the full field of view of the panoramic video 108. The target areas TAR_A-TAR_N may be cropped such that the target areas TAR_A-TAR_N provide additional margins (e.g., to provide a buffer area outside of the region of interest) and/or overlap each other to cover many possible coordinates for the region of interest. Each of the target areas TAR_A-TAR_N may cover a different position of the panoramic video 108 (e.g., the target areas TAR_A-TAR_N may overlap to provide a field of view that covers common areas, but the center coordinates of the target areas TAR_A-TAR_N may be different). In one example, the number of target areas TAR_A-TAR_N may be 20 or more. The size, layout and/or number of target areas TAR_A-TAR_N may be varied according to the design criteria of a particular implementation.

The content delivery network 70a-70n may receive the target areas TAR_A-TAR_N and the full field of view stream FFOV for each video frame of the panoramic video 108 from the apparatus 100. The playback devices 54a-54n may receive the full field of view stream FFOV and select one of the target areas TAR_A-TAR_N for each video frame from the content delivery network 70a-70n. Each of the playback devices 54a-54n may select one of the target areas TAR_A-TAR_N based on the region of interest (e.g., the current coordinates) of the respective playback devices 54a-54n. In an example, the playback devices 54a-54n may request the target areas using the signals CROI_A-CROI_N. The content delivery network 70a-70n may present the best match of the target areas TAR_A-TAR_N to the playback devices 54a-54n based on the region of interest coordinates CROI_A-CROI_N. In one example, the playback device 54i may select the target area TAR_B as the best match for the region of interest of the playback device 54i.

Since the signals TAR_A-TAR_N may be generated by the apparatus 100 for each frame, the signals CROI_A-CROI_N may not need to be communicated back to the apparatus 100 (e.g., no control loop back to the apparatus 100 may be implemented). In one example, the playback devices 54a-54n may be configured to select the target area that is the best match for the region of interest. In another example, the content delivery network 70a-70n may be configured to select the best match of the target areas TAR_A-TAR_N for each of the playback devices 54a-54n.

Figure 4:
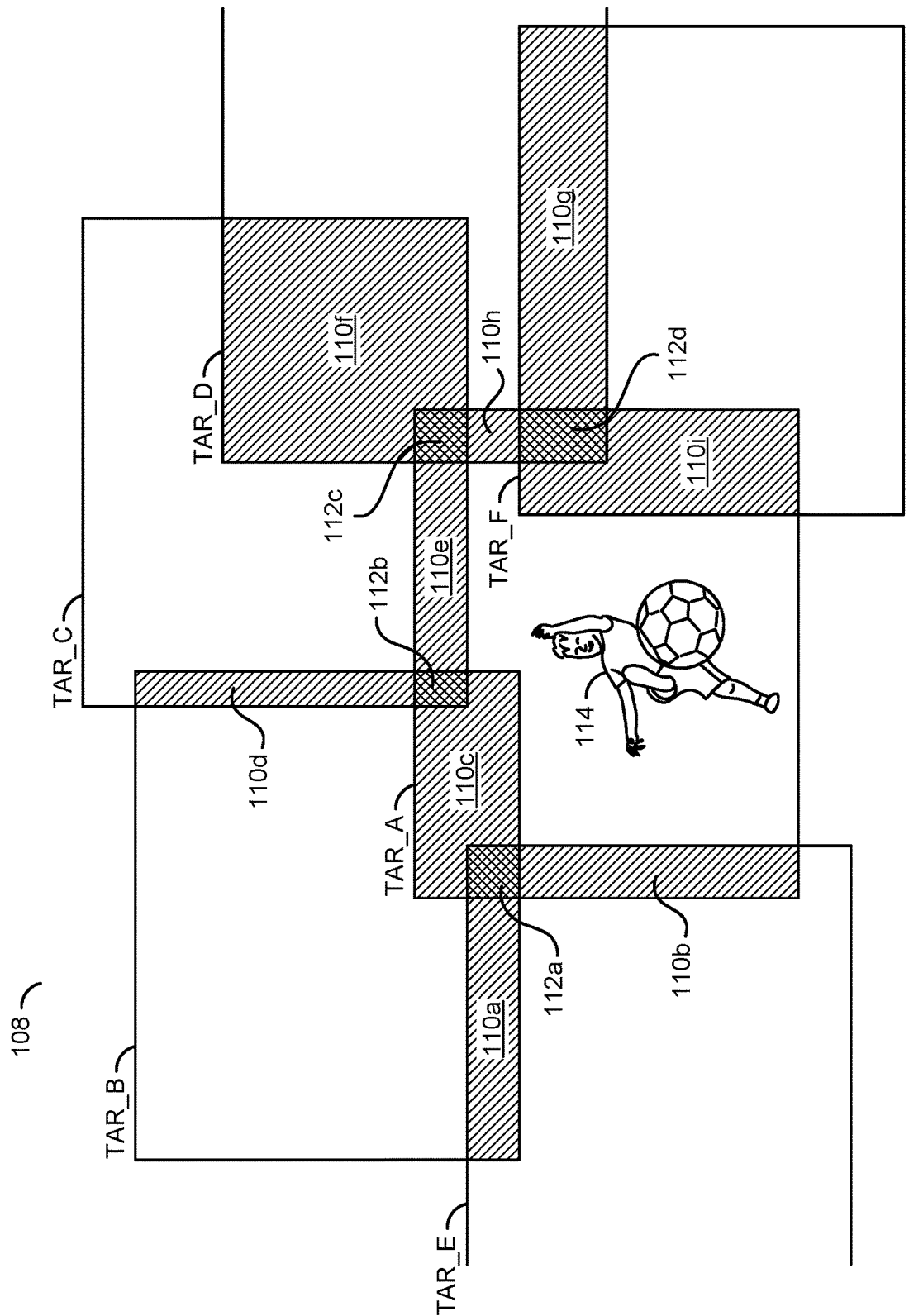
FIG. 4 is a diagram illustrating a portion of a full field of view of a panoramic video.

Referring to FIG. 4, a diagram illustrating a portion of a full field of view of the panoramic video 108 is shown. Example target areas TAR_A-TAR_F are shown. The example target areas TAR_A-TAR_F are shown to provide additional details of the layout of the target areas TAR_A-TAR_N cropped by the apparatus 100.

The apparatus 100 may crop the target areas TAR_A-TAR_N to provide a close match for various region of interest coordinates. To ensure a close match is available and/or ensure full coverage of the field of view of the panoramic video 108, one or more of the target areas TAR_A-TAR_N may overlap each other. Overlapping sections 110a-110i are shown. The overlapping sections 110a-110i may represent portions of the panoramic video 108 where two of the target areas TAR_A-TAR_F overlap each other.

Overlapping sections 112a-112d are shown. The overlapping sections 112a-112d may represent portions of the panoramic video 108 where three of the target areas TAR_A-TAR_F overlap each other.

The target areas TAR_A-TAR_N may be arranged on the panoramic video 108 such that there are no spaces that are not covered by the target areas TAR_A-TAR_N. In the example shown, the target area TAR_E may overlap with the target area TAR_B in the section 110a, the target area TAR_A in the section 110b and both the target areas TAR_A and TAR_B in the section 112a. The target area TAR_B is shown overlapping with the target area TAR_A in the section 110c, the target area TAR_C in the section 110d and both the target areas TAR_A and TAR_C in the section 112b. The target area TAR_C is shown overlapping with the target area TAR_A in the section 110e, the target area TAR_D in the section 110f and both the target areas TAR_A and TAR_D in the section 112c. The target area TAR_D is shown overlapping with the target area TAR_A in the section 110h, the target area TAR_F in the section 110g and both the target areas TAR_A and TAR_F in the section 112d. The target area TAR_F is shown overlapping with the target area TAR_A in the section 110i.

The best match for the playback devices 54a-54n may be selected from the target areas TAR_A-TAR_N based on the region of interest coordinates. In one example, the best match may be selected by the playback devices 54a-54n. In another example, the best match may be selected by the content delivery network 70a-70n. In yet another example, the best match may be selected by the processor 100. In some embodiments, the processor 100 may associate the coordinates of the panoramic video 108 (e.g., a range of coordinates) with one of the target areas TAR_A-TAR_N. The various ranges of coordinates may cover the full field of view of the panoramic video 108. The best match may be determined based on a comparison of the coordinates of the region of interest and the coordinates of the panoramic video 108 covered by the various target areas (e.g., the associated ranges). In an example, the playback device 54a may be viewing a region of interest having coordinates corresponding to (e.g., associated with) the target area TAR_A. The content delivery network 70a-70n may transmit the signal TAR_A and the signal FFOV to the playback device 54a. In another example, the best match may be the target area that has the associated range of coordinates with the closest proximity to the current region of interest coordinates of the playback device 54a.

The user of the playback device 54a may move the region of interest (e.g., make a head movement if the playback device 54a is a headset). For example, if the user moves the region of interest a small amount to the left, the region of interest coordinates may still correspond with the coordinates of the panoramic video 108 covered by the target area TAR_A (e.g., the head movement may be within an additional margin area of the target area). The playback device 54a may be configured to pan the region of interest coordinates displayed within the target area TAR_A. If the user moves the region of interest farther to the left, the region of interest coordinates may correspond to the coordinates of the panoramic video 108 covered by the target area TAR_E. The content delivery network 70a-70n may select the target area TAR_E as the best match and provide the target area TAR_E to the playback device. Similarly, if the user changes the region of interest to the top left, the content delivery network 70a-70n may change the target area delivered from TAR_A to TAR_B. If the user changes the region of interest to the top right, the content delivery network 70a-70n may change the target area delivered from TAR_A to TAR_C or TAR_D. If the user changes the region of interest to the right, the content delivery network 70a-70n may change the target area delivered from TAR_A to TAR_F.

A threshold for moving from one target area to another target area may be based on the number of target areas, the location of the target areas and/or the arrangement of the target areas. For example, one of the target areas (e.g., TAR_C) may be presented to the playback device 54i. When the region of interest coordinates of the playback device 54i are changed beyond a pre-defined threshold, a new target area (e.g., the target area TAR_F) may be presented to the playback device 54i. When the region of interest coordinates of the playback device 54i are not changed beyond the pre-defined threshold, the playback device 54i may pan the region of interest within the current target area (e.g., playback a different section of the target area).

An object 114 is shown in the target area TAR_A. In the example shown, the object 114 may be a child kicking a ball. In some embodiments, the apparatus 100 may be configured to perform video analysis to detect (e.g., recognize) one or more objects in the panoramic video 108. For example, the apparatus 100 may detect the object 114 and/or distinguish the object 114 from other visual data in the panoramic video 108. The apparatus 100 may crop the target areas TAR_A-TAR_N based on the detected objects. In an example, one of the target areas TAR_A-TAR_N may be centered on the object 114 in each video frame of the panoramic video 108. For example, as the location coordinates of the object 114 moves over time throughout the panoramic video stream 108, the position of the target area TAR_A may be moved to ensure the target area TAR_A is centered on the object 114. The location of the target areas TAR_B-TAR_N may be adjusted (e.g., added, subtracted, resized, location changed, amount of overlap adjusted, etc.) as the location of the target area TAR_A is moved.

Figure 5:
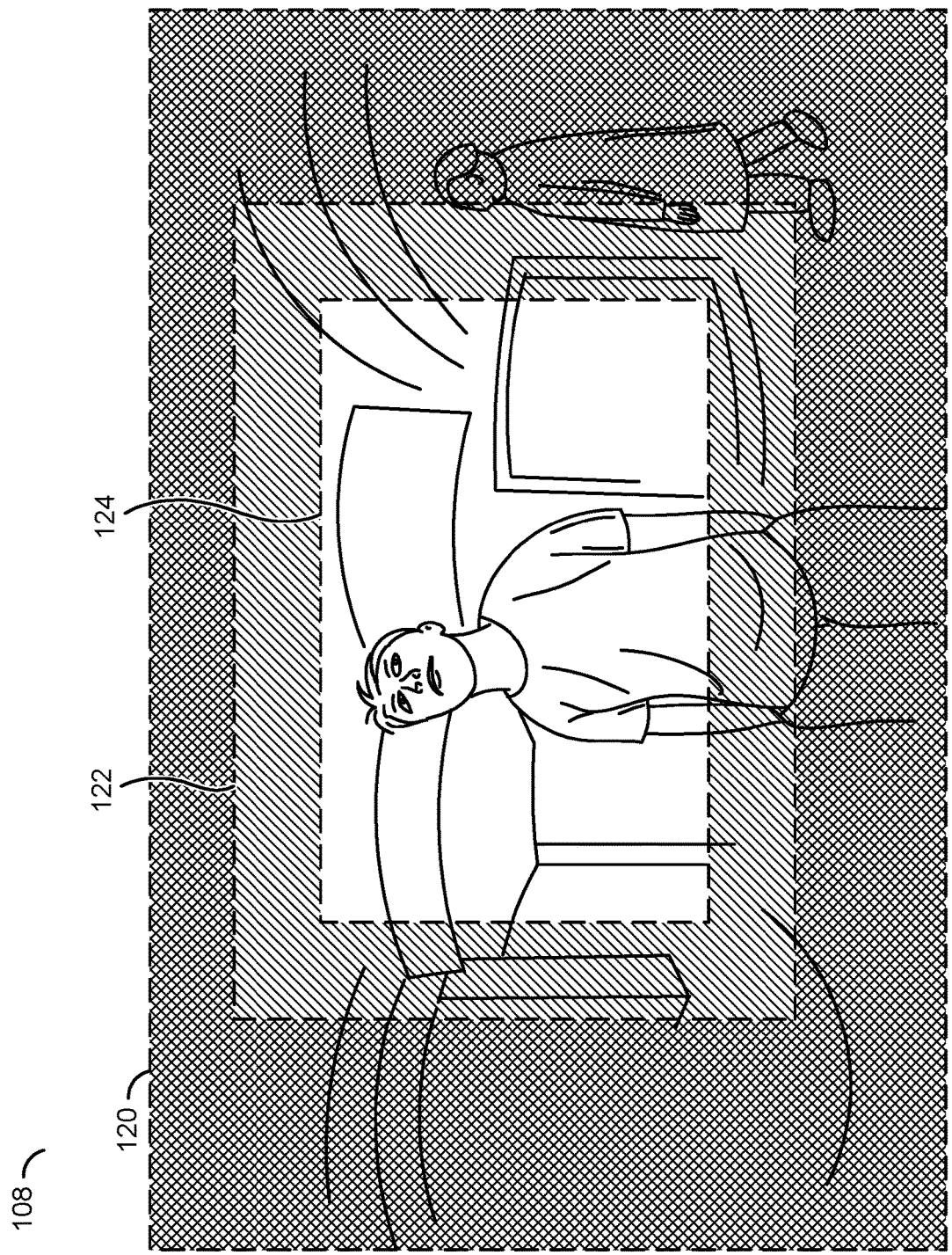
FIG. 5 is a diagram illustrating a sample portion of video.

Referring to FIG. 5, a diagram of a sample portion of the panoramic video 108 is shown. The portion may be an equirectangular projection of the full panoramic field of view. The equirectangular projection may have a slightly distorted representation of the captured video. For example, when the video is viewed by one of the users with one of the playback devices 54a-54n, the captured video may appear as the panoramic field of view (e.g., an immersive video). A window 120, a window 122 and a window 124 are shown. The window 122 may be slightly larger than the window 124.

The window 124 may be the region of interest. For example, the region of interest 124 may be the portion of the panoramic video frame displayed on the playback devices 54a-54n. The window 122 may be an additional area surrounding the region of interest 124. The additional area 122 may be next to the region of interest 124. For example, the additional area 122 may be the margins around the region of interest 124. The window 120 may represent a remaining area of the panoramic video 108 (e.g., a region outside the region of interest 124 and/or the additional area 122). The size and/or amount of pixels comprising the remaining area 120, the additional area 122 and/or the region of interest 124 may be varied according to the design criteria of a particular implementation.

The apparatus 100 may be configured to encode a target area of the upcoming video frames of the panoramic video 108 using the high quality compression (e.g., generate the signals TAR_A-TAR_N). The apparatus 100 may be configured to encode the full field of view of the panoramic video 108 using the low quality compression (e.g., generate the signal FFOV). In some embodiments, the apparatus 100 may be configured to encode other portions of the panoramic video 108 using a low quality compression. In some embodiments, the apparatus 100 may encode the panoramic video 108 using additional (e.g., intermediate) quality compressions.

In one example, the target area (e.g., the area using the parameters for the high quality compression) may be the additional area 122 and the region of interest 124. In some embodiments, the signals TAR_A-TAR_N may comprise the region of interest 124. The remaining area 120 may be encoded using the parameters for the low quality compression. In another example, the target area (e.g., the signals TAR_A-TAR_N) may be the region of interest 124 and the remaining area 120 and the additional area 122 may be encoded using the low quality compression. In yet another example, the region of interest 124 may be encoded using the parameters for the high quality compression, the additional area 122 may be encoded using parameters for the intermediate quality compression and the remaining area 120 may be encoded using the parameters for the low quality compression. The panoramic video 108 viewed using the playback devices 54a-54n may comprise the remaining area 120, the additional area 122 and the region of interest 124.

The region of interest 124 may be moved relative to the panoramic field of view based on the signals CROI_A-CROI_N. Similarly, the additional area 122 and/or the remaining area 120 may be moved. In some embodiments, the additional area 122 may surround the region of interest 124. For example, the additional area 122 may be a border (or margin) having a pre-determined number of pixels around the region of interest 124. In some embodiments, the size of the additional area 122 may be determined based on user input. For example, the size of the additional area 122 may be a number of pixels that an average user usually moves (e.g., by turning his or her head) when viewing the panoramic video 108. In another example, the size of the additional area 122 may be based on practical limitations (e.g., an amount of bandwidth available, a processing capability of the apparatus 100 and/or the playback devices 54a-54n, etc.). In yet another example, the size of the additional area 122 may be based on a preference of the user (e.g., a user configuration). The size of the additional area 122 may be varied according to the design criteria of a particular implementation.

When the user makes a small change in head position, the image quality shown on the corresponding one of the displays 54a-54n may remain high. The additional area 122 may implement a high quality region that may be larger than the image displayed on the playback devices 54a-54n (e.g., the region of interest 124). For example, the playback device 54a may refresh the displayed region of interest in response to head movements and when the display of the playback device 54a is refreshed to the additional area 122, the quality of the section of the panoramic video 108 seen by the user may remain high quality. The difference in size between the additional area 122 and the region of interest 124 may be configured to accommodate small head movements. For example, the additional area 122 may act as a buffer for the region of interest 124.

When the users makes large changes in head position (less common), the image quality on the displays 54a-54n may drop for a short time until the new center (e.g., coordinates) for the region of interest 124 is updated (e.g., the signals CROI_A-CROI_N are sent to the content delivery network 70a-70n and/or the apparatus 100) and the encoded settings change accordingly (e.g., the updated signals TAR_A-TAR_N and/or FFOV are sent). The latency on the network may impact the image quality for a short time (e.g., in the less common cases where the user makes large head movements). In many cases, when the apparatus 100 is implemented the latency on the network may not impact the image quality and/or latency at all.

In some embodiments, the target areas TAR_A-TAR_N may be pre-defined crops of the panoramic video 108 comprising the region of interest 124 and the additional area 122. The additional area 122 may provide a margin (or buffer) around the region of interest 124 of the same (e.g., higher) visual quality compression used to generate the region of interest 124. In the example shown, the center of the region of interest 124 is at a center of the additional area 122. The center of the region of interest 124 may be panned (e.g., moved left/right and/or up/down) within the additional area 122 of the pre-defined crop.

Panning the region of interest 124 within the additional area 122 may enable the pre-defined target area to be the same for each frame of the panoramic video 108 while allowing the user to view different areas within the target areas TAR_A-TAR_N. Using the same pre-defined target area for sequential video frames may enable buffering of the upcoming frames. When the coordinates of the region of interest move outside of the additional area 122, a new target area may be requested (e.g., a new best match). Using a new target area may result in a temporary low-quality video playback until the new best match target area is received and/or a memory buffer is filled. The pre-defined threshold for changing from one of the target areas to a new target area may be based on the coordinates of the panoramic video 108 covered by the target area and the coordinates of the region of interest.

Figure 6:
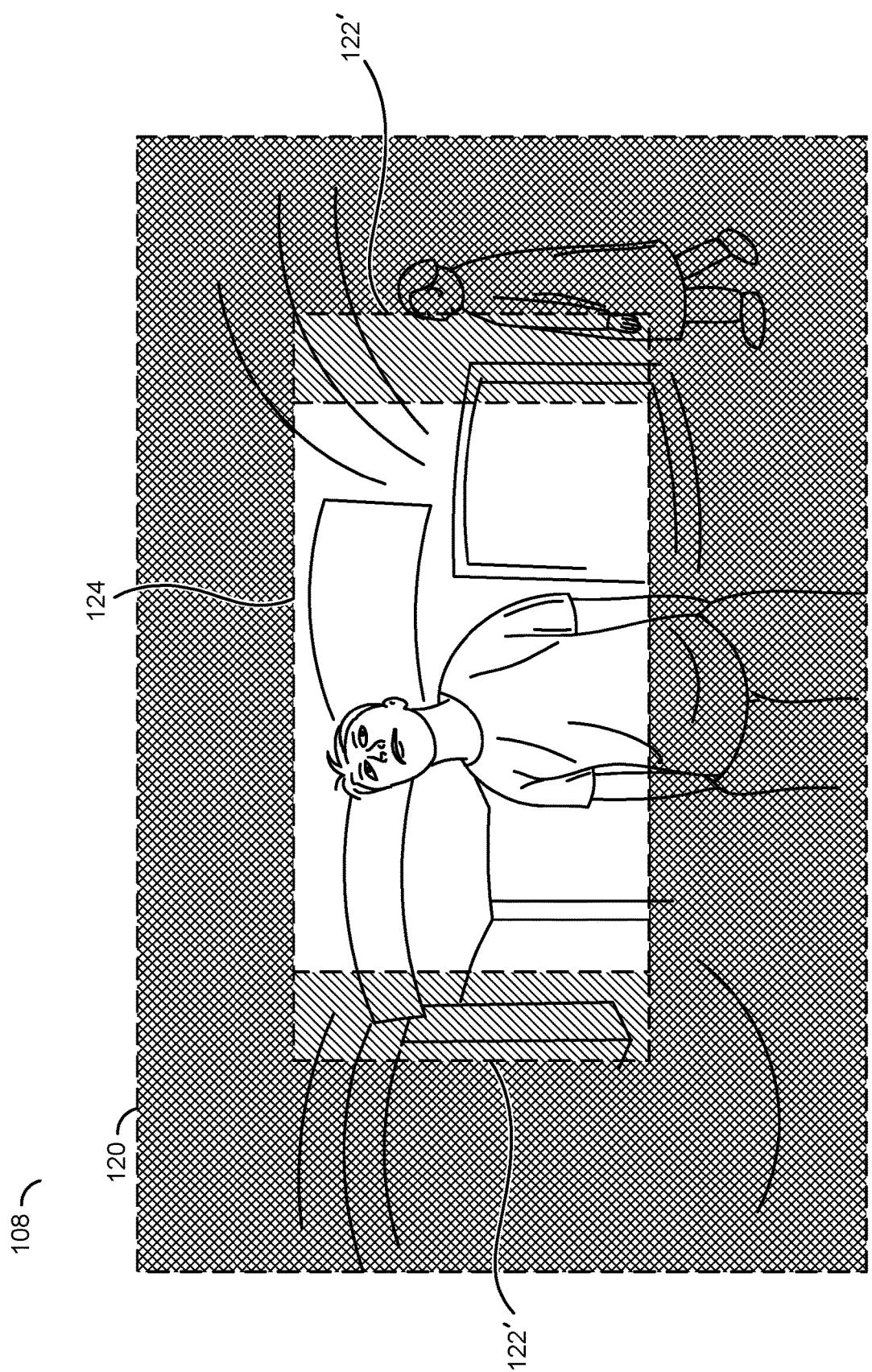
FIG. 6 is a diagram illustrating an alternate sample portion of video.

Referring to FIG. 6, a diagram of an alternate sample portion of the panoramic video 108 is shown. The equirectangular projection of the panoramic field of view may have various arrangements of the remaining area 120, the additional area 122' and/or the region of interest 124. The arrangement of the remaining area 120, the additional area 122' and/or the region of interest 124 may be based on user preferences, practical limitations (e.g., processing capability of the apparatus 100, the playback devices 54a-54n, network speed, etc.), and/or expected use of the panoramic video 108 (e.g., the type of input the user is expected to provide).

In the example shown, the region of interest 124 may be similar to the region of interest 124 shown in FIG. 5. The region of interest 124 may be encoded using the parameters for the high quality compression. The remaining area 120 may be encoded using the parameters for the low quality compression. The additional area 122' may be encoded using the parameters for the high quality compression (e.g., the additional area 122' may be part of the target area). In some embodiments, the additional area 122' may be encoded using the parameters for the intermediate quality compression.

The additional area 122' is shown as two segments of the panoramic video 108 next to the region of interest 124. In the example shown, the additional area 122' is shown as a portion of the panoramic video 108 to the left of the region of interest 124 and a portion of the panoramic video 108 to the right of the region of interest 124. In some embodiments, the additional area 122' may be a portion of the panoramic video 108 above the region of interest 124 and a portion of the panoramic video 108 below the region of interest 124. For example, the additional area 122' may not surround the region of interest 124 as a continuous segment. The width and/or height of the additional area 122' may be varied according to the design criteria of a particular implementation.

In some embodiments, the additional area 122' may be selected based on an expected input from the user. For example, the panoramic video 108 captured by the camera 52 may be a panoramic video of an indoor environment. Since indoor environments may have little of interest when the user looks up and/or down (e.g., the user may see the ceiling and the floor, which may be considered uninteresting), the additional area 122' may be to the left and/or right of the region of interest 124. The expected input may be that the user may turn his or her head to the left or right often and rarely look up or down. For example, the additional area 122' may be configured to cover a larger portion of the panoramic video 108 to the left and/or right of the region of interest 124 than the additional area 122 (shown in FIG. 5) may cover to the left and/or right of the region of interest 124 without increasing the amount of bandwidth needed for transmission of the signals TAR_A-TAR_N and/or FFOV.

In embodiments, with the additional area 122' to the left and/or right of the region of interest 124, the center of the region of interest 124 may pan left and/or right within the target area. For example, the center of the region of interest 124 may be panned left/right but not up/down. Since, in the example shown, the additional area 122' does not have extra margins above and/or below the region of interest 124, when the center coordinates of the region of interest 124 are moved up/down (e.g., based on head movements of the user wearing the playback device 54a) the content delivery network 70a-70n may provide a different one of the target areas TAR_A-TAR_N.

Figure 7:
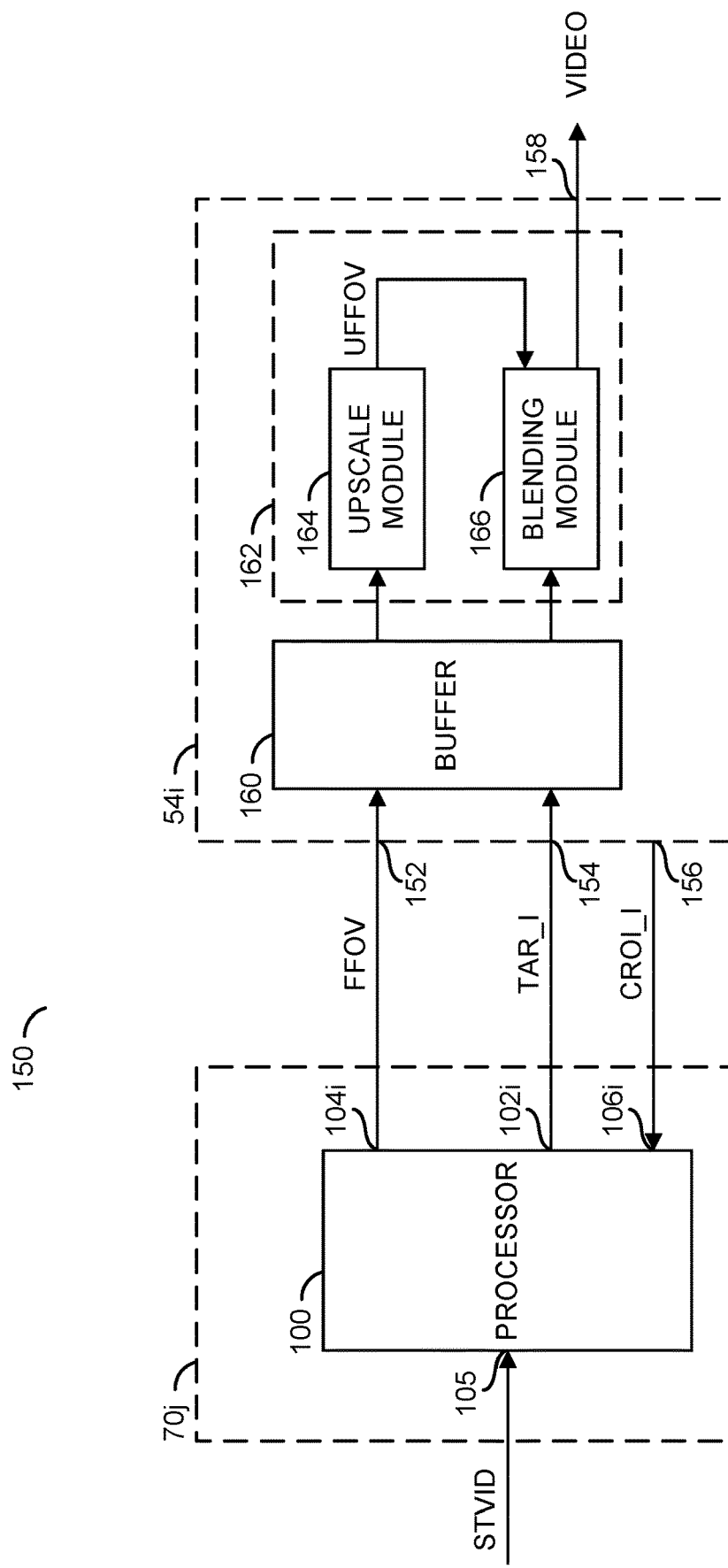
FIG. 7 is a diagram illustrating a transmission of a downscaled panoramic video and a high quality target area.

Referring to FIG. 7, a diagram illustrating a transmission of a downscaled panoramic video and a high quality target area is shown. An example connection 150 is shown between the apparatus 100 (e.g., implemented on the server 70j) and the playback device 54i. The server 70j and/or the playback device 54i may be a representative example. Similar connections may be implemented between the apparatus 100 and each of the playback devices 54a-54n.

The input interface 105 of the apparatus 100 may receive the signal STVID. The output interface 104i of the apparatus 100 may transmit the signal FFOV (e.g., the downscaled version of the panoramic video 108) to the playback device 54i. The playback device 54i may receive the signal FFOV at an input interface 152. The output interface 102i of the apparatus 100 may transmit the signal TAR_I (e.g., the cropped target area encoded using the high quality compression parameters) to the playback device 54i. The playback device 54i may receive the signal TAR_I at an input interface 154. The playback device 54i may be configured to buffer the signal FFOV and/or the signal TAR_I for upcoming video frames of the panoramic video 108. The playback device 54i may be configured to perform upscaling and/or blending. The playback device 54i may be configured to upscale the signal FFOV and/or blend the target area TAR_I with the upscaled version of the panoramic video 108. In an example, using the playback device 54i for upscaling and/or blending instead of the apparatus 100 may reduce an amount of power consumption and/or the amount of data transmitted by the servers 70a-70n.

The input interface 106*i* of the apparatus 100 may be configured to receive the signal CROI_I from the playback device 54*i*. An output interface 160 of the playback device 54*i* may present the signal CROI_I. In some embodiments, the signal CROI_I may be transmitted to the server 70*j* (e.g., part of the content delivery network 70*a*-70*n*) instead of the input interface 106*i*. Other signals may be transmitted between the apparatus 100, the server 70*j* and/or the playback device 54*i* (not shown). The number and/or types of signals may be varied according to the design criteria of a particular implementation.

The playback device 54*i* may comprise a block (or circuit) 160 and/or a block (or circuit) 162. The circuit 160 may implement a memory buffer. In an example, the circuit 162 may implement a hardware engine configured to perform operations on the video streams received (e.g., the signal FFOV and/or the signal TAR_I). In another example, the circuit 162 may be an interface for receiving the signal FFOV and/or the signal TAR_I. In yet another example, the circuit 162 may be a video processor, a video encoder and/or a video decoder. The circuit 162 may receive the signal FFOV and/or the signal TAR_I. The circuit 162 may output a signal (e.g., VIDEO). The circuit 162 may comprise a block (or circuit) 164 and/or a block (or circuit) 166. The circuit 164 may implement an upscale module. The circuit 166 may implement a blending module. The playback device 54*i* may comprise other components (not shown).

The memory buffer 160 may provide a temporary storage for upcoming video frames for the panoramic video 108 of the target area (e.g., TAR_I) and/or the signal FFOV. Providing temporary storage for upcoming video frames of the panoramic video 108 may be implemented to enable smooth video playback (e.g., avoid delays, prevent pauses in playback, reduce lag, reduce an effect of communication interruptions, etc.). Generally, the signal FFOV may be used for upcoming video frames of the panoramic video 108 regardless of the target area selected. Buffering the selected target area TAR_I may enable a high visual quality while the region of interest coordinates of the playback device 54*i* are within the coordinates of the panoramic video 108 covered by the target area TAR_I.

In an example, when the region of interest coordinates are changed and remain within the coordinates of the target area TAR_I (e.g., the region of interest coordinates have not changed beyond the pre-defined threshold), the playback device 54*i* may playback the signal VIDEO generated using the target area TAR_I. Since the upcoming target areas TAR_I may be stored in the memory buffer 160, the user may experience playback without a loss in visual quality (e.g., the user may not see the remaining area 120). In another example, when the region of interest coordinates are changed and do not remain within the coordinates of the target area TAR_I (e.g., the region of interest coordinates have changed beyond the pre-defined threshold), the playback device 54*i* may not have access to the best match for the target area. The buffered target areas TAR_I in the memory buffer 160 may not have the appropriate data. The playback device 54*i* may request a new target area (e.g., using the signal CROI_I). The content delivery network 70*a*-70*n* may transmit a new target area (e.g., covering different coordinates of the panoramic video 108) as the best match for the region of interest coordinates of the playback device 54*i*. The playback device 54*i* may display the signal VIDEO having a lower visual quality (e.g., display portions of the remaining area 120) until the new target area is received. Upcoming video frames of the new best match target area may be stored in the memory buffer 160.

The memory buffer 160 may be implemented to compensate for temporal drops in bandwidth. The capacity of the memory buffer 160 may represent a trade-off between a number of frames to store (e.g., to provide longer protection against temporal drops in bandwidth) and a latency resulting from changing the selected target areas. Switching from one target area stream to another target area stream (e.g., changing from the signal TAR_I to the signal TAR_K) may result in the user seeing a lower visual quality (e.g., the remaining area 120) for an amount of time until the target area TAR_K is received. The latency between seeing the lower visual quality and the playback device 54*i* presenting the signal VIDEO using the new best match target area may be based on a function of the size of the memory buffer 160. For example, the bigger the capacity of the memory buffer 160, the longer the user may see the lower quality video when the region of interest is changed drastically. The capacity of the memory buffer 160 may be varied according to the design criteria of a particular implementation.

The upscale module 164 may receive the signal FFOV. The upscale module 164 may generate a signal (e.g., UFFOV). The blending module 166 may receive the signal TAR_I and/or the signal UFFOV. The blending module 166 may generate the signal VIDEO. For example, one of the other components of the playback device 54*i* may be a communication device. In another example, one of the other components of the playback device 54*i* may be a decoder. The number, layout and/or functionality of the components of the playback device 54*i* may be varied according to the design criteria of a particular implementation.

The signal FFOV may be a full, downscaled panoramic video signal. The apparatus 100 may be configured to perform video stitching operations on the signals STVID and perform downscaling to generate the signal FFOV. In the embodiment 150, the apparatus 100 may downscale the full field of view of the panoramic video signal (e.g., the remaining area 120, the additional area 122 and the region of interest 124). Downscaling the entire field of view of the panoramic video signal 108 may reduce an amount of processing and/or storage (e.g., compared to generating multiple downscaled cropped versions of the remaining area 120 that correspond to each of the target areas TAR_A-TAR_N).

The signal TAR_I may be the cropped portion of the panoramic video signal 108 (e.g., the additional area 122 and/or the region of interest 124 selected based on the signal CROI_I). The apparatus 100 may be configured to process, analyze, filter, encode and/or compress the portion of the signals STVID to generate the signals TAR_A-TAR_N. The signal TAR_I may be the target area selected for the playback device 54*i*.

The signal FFOV and the signal TAR_I may be streamed together. For example, the signal FFOV may represent one full panoramic video frame and the signal TAR_I may represent a portion of the same panoramic video frame. The interface 102*i* and/or the interface 104*i* may synchronize a delivery of the signal FFOV and/or the signals TAR_A-TAR_N. The signal FFOV and the signal TAR_I may be synchronized such that the video data in the panoramic video frames and the target areas correspond to a same time of capture by the capture devices 60*a*-60*n*. The signal FFOV and the signal TAR_I may be transmitted as two separate streams of data. Sending the signal FFOV and the signal TAR_I as separate streams of data may reduce a workload on the apparatus 100 (e.g., reduced battery drain, reduced time to generate the panoramic video, reduced heat generated, etc.). Sending the signal FFOV as a separate stream may enable the apparatus 100 to dynamically update the panoramic video 108 (e.g., update the high quality portion in response to the region of interest currently viewed by the user to limit a negative impact on the viewing experience).

The upscale module 164 may be configured to upscale the signal FFOV. In an example, the upscale module 164 may upscale the signal FFOV to a resolution and/or pixel density corresponding to the playback capability (e.g., specifications) of the playback device 54i. In some embodiments, the upscaling performed by the upscale module 164 may comprise interpolation and/or sampling. The signal UFFOV may be the upscaled version of the signal FFOV. The signal UFFOV may be transmitted to the blending module 166. The implementation of the upscaling may be varied according to the design criteria of a particular implementation.

The blending module 166 may be configured to blend the portion of the panoramic video TAR_I with the upscaled full panoramic video signal UFFOV. Blending the signal TAR_I with the signal UFFOV may generate a panoramic video having a higher visual quality in the target area (e.g., the region of interest 124 and/or the additional area 122) than in the remaining area 120. For example, the target area may be a blend of the signal TAR_I and the signal UFFOV and the remaining area 120 may be the signal UFFOV. The blending of the signal TAR_I and the signal UFFOV may generate the signal VIDEO. The blending module 166 may generate the signal VIDEO. The signal VIDEO may be presented on an output interface 158. The signal VIDEO may be displayed to the end user. The signal VIDEO may be the panoramic video frames of the cropped, upscaled and blended panoramic video. The signal VIDEO may be viewable by the end user (e.g., using a headset, a computer monitor, a smartphone, etc.). The implementation of the blending may be varied according to the design criteria of a particular implementation.

Figure 8:
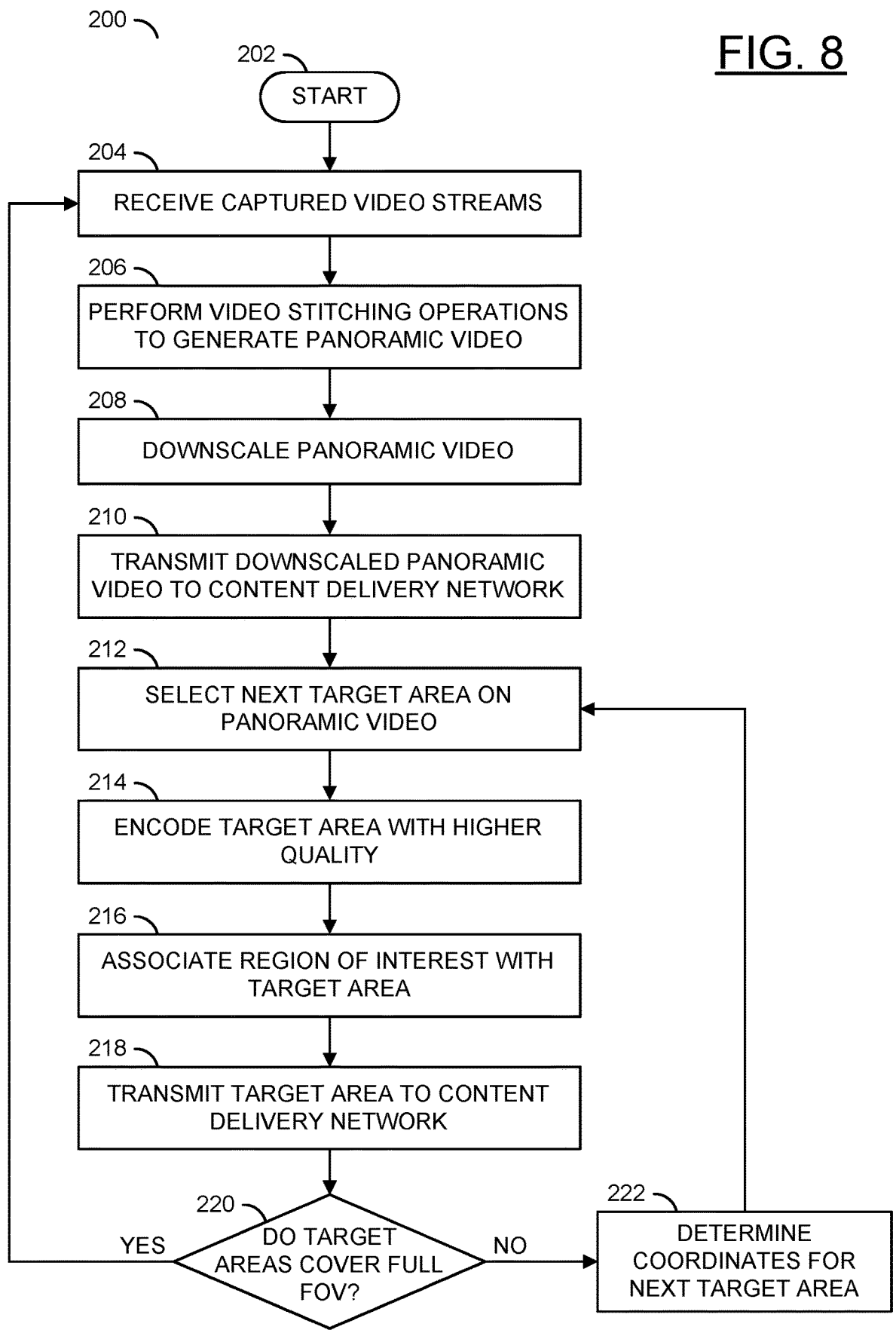
FIG. 8 is a flow diagram illustrating a method for generating a downscaled panoramic video and target areas that cover a full field of view of a panoramic video.

Referring to FIG. 8, a method (or process) 200 is shown. The method 200 may generate a downscaled panoramic video and target areas that cover a full field of view of a panoramic video. The method 200 generally comprises a step (or state) 202, a step (or state) 204, a step (or state) 206, a step (or state) 208, a step (or state) 210, a step (or state) 212, a step (or state) 214, a step (or state) 216, a step (or state) 218, a decision step (or state) 220, and a step (or state) 222.

The state 202 may start the method 200. Next, in the state 204, the processor 100 may receive the captured video streams (e.g., the signal STVID) via the input interface 105. In an example, the signal STVID may be presented by the camera 52. In the state 206, the processor 100 may be configured to perform video stitching operations to generate the panoramic video 108 (e.g., based on the signal(s) STVID). Next, in the state 208, the processor 100 may be configured to downscale the panoramic video 108 (e.g., generate the downscaled panoramic video stream FFOV). In an example, the processor 100 may implement encoding parameters to generate the downscaled panoramic video stream FFOV. In the state 210, the processor 100 may be configured to transmit the downscaled panoramic video signal FFOV via the output interfaces 102a-102n.

In the state 212, the processor 100 may select a next target area on the panoramic video 108 (e.g., one of the target areas TAR_A-TAR_N). In one example, for a first iteration, the processor 100 may select the target area TAR_A. In another example, after the target area TAR_A has already been selected, the processor 100 may select the target area TAR_B. In some embodiments, the processor 100 may divide the panoramic video 108 into pre-determined sections each having a size of the region of interest 124 and/or the additional area 122 to cover the entire field of view of the panoramic video 108. The target areas TAR_A-TAR_N may be selected by the processor 100 in sequential order, randomly and/or in some other order (e.g., based on a determined likelihood of being viewed by a user, which may be determined based on video analytics performed by the processor 100). The selection performed by the processor 100 may be a selection of coordinates representing the location of the selected target area with respect to the panoramic video 108.

In the state 214, the processor 100 may be configured to encode the selected target area with the higher quality (e.g., encoding parameters that generate a better visual quality than the downscaled panoramic video FFOV, a higher bitrate than the downscaled panoramic video FFOV, a more efficient compression than the downscaled panoramic video FFOV, etc.). Next, in the state 216, the processor 100 may associate a region of interest with the selected target area. For example, associating a region of interest with the selected target area may comprise determining a range of coordinates for the signals CROI_A-CROI_N that may be used to select the target area.

Since the processor 100 may generate a limited number of pre-defined target areas, the target areas TAR_A-TAR_N may not match precisely with the region of interest currently viewed on the playback devices 54a-54n (e.g., the signals CROI_A-CROI_N). Associating the target areas TAR_A-TAR_N with a range of region of interest coordinates may enable the best match for the targets areas TAR_A-TAR_N to be selected based on the current region of interest coordinates CROI_A-CROI_N. For example, if the current region of interest CROI_I for the playback device 54i is within the range of coordinates associated with the target area TAR_B, then the content delivery network 70a-70n may deliver the target area TAR_B to the playback device 54i. The range of region of interest coordinates associated with each of the target areas TAR_A-TAR_N may be varied according to the design criteria of a particular implementation.

In the state 218, the processor 100 may transmit the selected target area to the content delivery network 70a-70n via one or more of the output interfaces 102a-102n. Next, the method 200 may move to the decision state 220. In the decision state 220, the processor 100 may determine whether the target areas that have already been selected cover the full field of view of the panoramic video 108 (e.g., whether the processor 100 has associated coordinates with each of the target areas TAR_A-TAR_N). If the target areas already selected do cover the full field of view of the panoramic video 108, the method 200 may return to the state 204. If the target areas already selected do not cover the full field of view of the panoramic video 108, the method 200 may move to the state 222. In the state 222, the processor 100 may determine the coordinates of the panoramic video 108 for the next target area. For example, the processor 100 may determine a location for the next target area and/or an amount of overlap for the next target area with one or more of the previously selected target areas. Next, the method 200 may return to the state 212.

Figure 9:
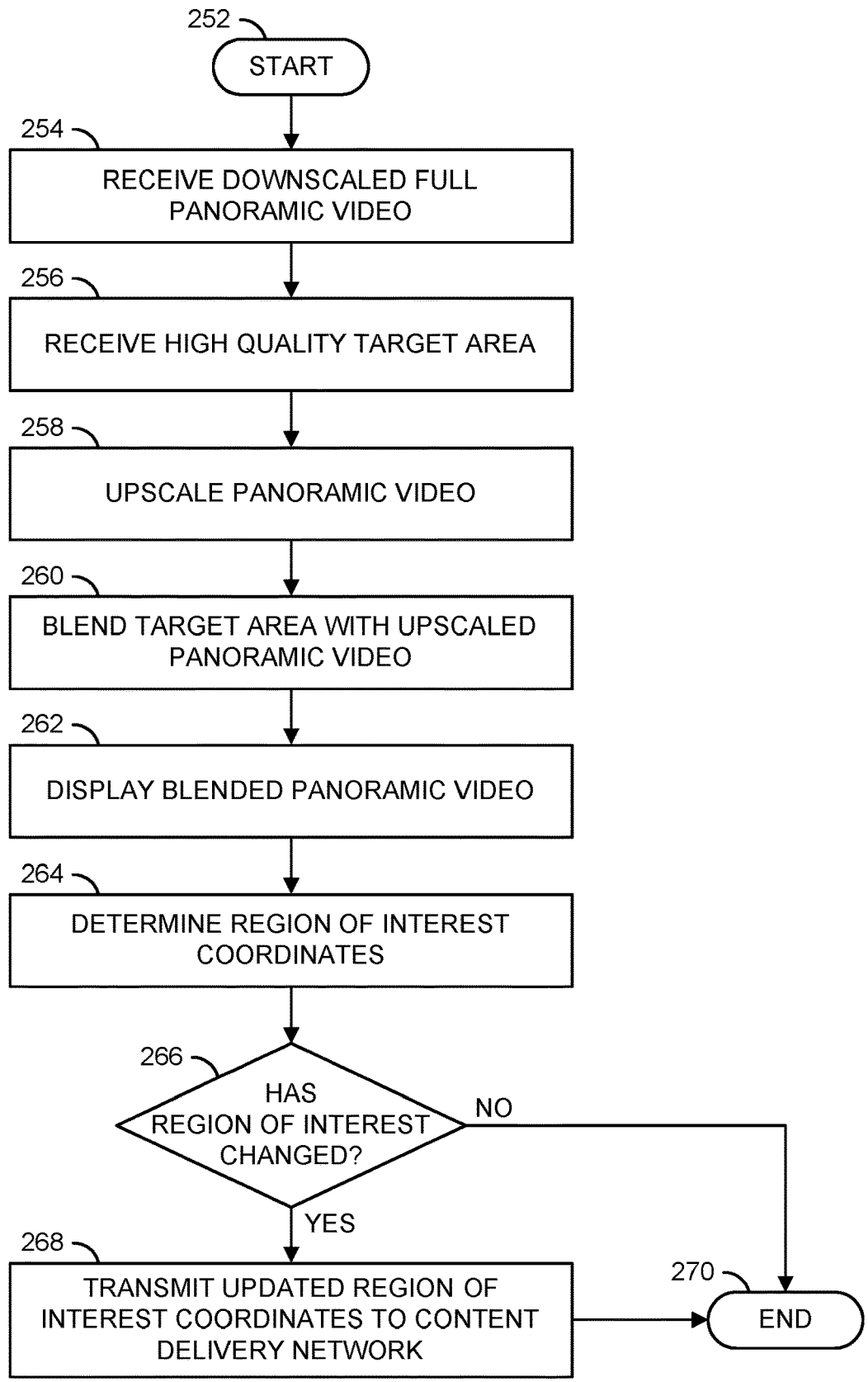
FIG. 9 is a flow diagram illustrating a method for blending a high quality target area and a lower quality full field of view of a panoramic video on a playback device.

Referring to FIG. 9, a method (or process) 250 is shown. The method 250 may blend a high quality target area and a lower quality full field of view of a panoramic video on a playback device. The method 250 generally comprises a step (or state) 252, a step (or state) 254, a step (or state) 256, a step (or state) 258, a step (or state) 260, a step (or state) 262, a step (or state) 264, a decision step (or state) 266, a step (or state) 268, and a step (or state) 270.

The state 252 may start the method 250. Next, in the state 254, the playback device 54*i* may receive the downscaled full panoramic video FFOV. For example, the processor 100 may generate the signal FFOV, the content delivery network 70*a*-70*n* may deliver the signal FFOV, the input interface 152 may receive the signal FFOV and/or the buffer 160 may store the signal FFOV. In the state 256, the playback device 54*i* may receive the high quality target area (e.g., one of the signals TAR_A-TAR_N). For example, the processor 100 may generate the signal TAR_I, the content delivery network 70*a*-70*n* may deliver the signal TAR_I, the input interface 154 may receive the signal TAR_I and/or the buffer 160 may store the signal TAR_I.

Next, in the state 256, the upscale module 164 may upscale the downscaled panoramic video stream FFOV (e.g., generate the signal UFFOV based on the signal FFOV). In the state 260, the blending module 166 may blend the target area TAR_I with the upscaled panoramic video UFFOV (e.g., generate the signal VIDEO based on the signal UFFOV and the signal TAR_I). Next, in the state 262, the playback device 54*i* may display the blended panoramic video. For example, the playback device 54*i* may present the signal VIDEO to the end-user.

In the state 264, the playback device 54*i* may determine the region of interest coordinates (e.g., the signal CROI_I). For example, the region of interest coordinates may be determined using a gyroscope, an inertial measurement unit, software feedback, etc. The region of interest coordinates may be determined based on where the end-user is currently looking. Next, the method 250 may move to the decision state 266.

In the decision state 266, the playback device 54*i* may determine whether the region of interest has changed. If the region of interest has not changed, the method 250 may move to the state 270. If the region of interest has changed, the method 250 may move to the state 268. In the state 268, the playback device 54*i* may transmit the updated region of interest coordinates to the content delivery network 70*a*-70*n*. In an example, the output interface 156 may present the signal CROI_I to the content delivery network 70*a*-70*n* and/or the processor 100. Next, the method 250 may move to the state 270. The state 270 may end the method 250.

Figure 10:
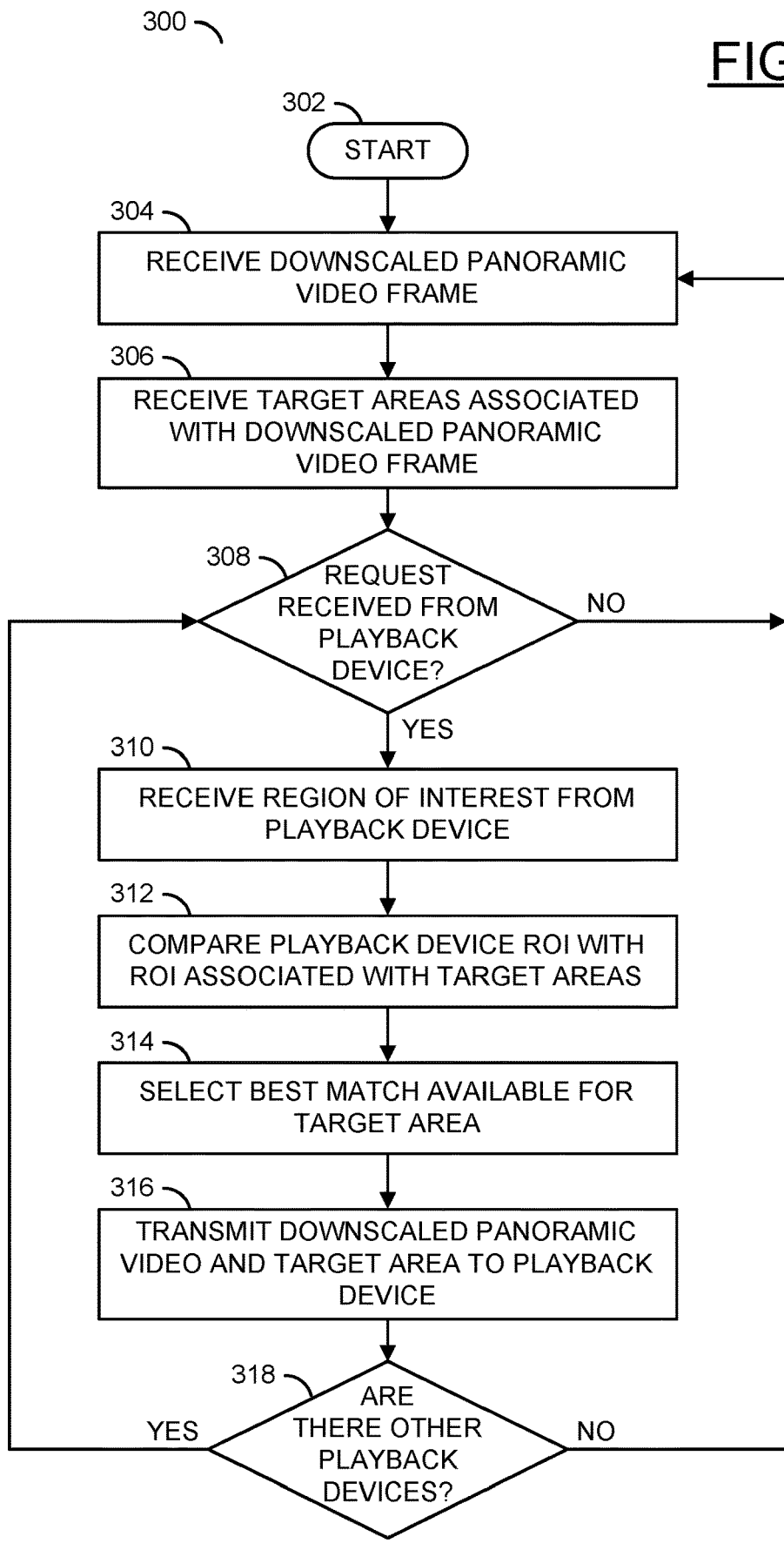
FIG. 10 is a flow diagram illustrating a method for selecting a best match target area based on a region of interest of a playback device.

Referring to FIG. 10, a method (or process) 300 is shown. The method 300 may select a best match target area based on a region of interest of a playback device. The method 300 generally comprises a step (or state) 302, a step (or state) 304, a step (or state) 306, a decision step (or state) 308, a step (or state) 310, a step (or state) 312, a step (or state) 314, a step (or state) 316, and a decision step (or state) 318.

The state 302 may start the method 300. In the state 304, the content delivery network 70*a*-70*n* may receive the downscaled panoramic video frame(s) FFOV. Next, in the state 306, the content delivery network 70*a*-70*n* may receive each of the target areas TAR_A-TAR_N associated with the panoramic video frame FFOV. For example, the downscaled panoramic video frame(s) FFOV and/or the associated target areas TAR_A-TAR_N may each be time stamped (e.g., as part of the file metadata) to ensure the target areas and the full fields of view are synchronized. Next, the method 300 may move to the decision state 308.

In the decision state 308, the content delivery network 70*a*-70*n* may determine whether a request has been received from one of the playback devices 54*a*-54*n*. For example, a request may comprise an HTML request, an FTP request, a RTMP request and/or other type of internet communication request for data. The request may be to initiate a transmission of a video stream and/or receive a next video frame for a video stream. The request may comprise the signals CROI_A-CROI_N from the corresponding playback devices 54*a*-54*n* to provide the current region of interest viewed by the end users. If the content delivery network 70*a*-70*n* has not received a request from at least one of the playback devices (e.g., the playback device 54*i*), the method 300 may return to the state 304. If the content delivery network 70*a*-70*n* has received a request from the playback devices 54*i*, the method 300 may move to the state 310. In the state 310, the content delivery network 70*a*-70*n* may receive the region of interest (e.g., the current coordinates) CROI_I from the corresponding playback device 54*i*. Next, in the state 312, the content delivery network 70*a*-70*n* and/or the processor 100 may compare the current region of interest of the playback device 54*i* (e.g., the signal CROI_I) with the regions of interest (e.g., the range of coordinates) associated with the target areas TAR_A-TAR_N. In the state 314, the content delivery network 70*a*-70*n* and/or the processor 100 may select the best match from the available target areas TAR_A-TAR_N based on the received current region of interest coordinates CROI_I.

Next, in the state 316, the content delivery network 70*a*-70*n* may transmit the downscaled panoramic video signal FFOV and the selected target area (e.g., the best match) to the playback device 54*i*. Next, the method 300 may move to the decision state 318. In the decision state 318, the content delivery network 70*a*-70*n* may determine whether there are other of the playback devices 54*a*-54*n* on the network. If there are other of the playback devices 54*a*-54*n* on the network, the method 300 may return to the decision state 308. If there are no other of the playback devices 54*a*-54*n* on the network, the method 300 may return to the state 304.

Figure 11:
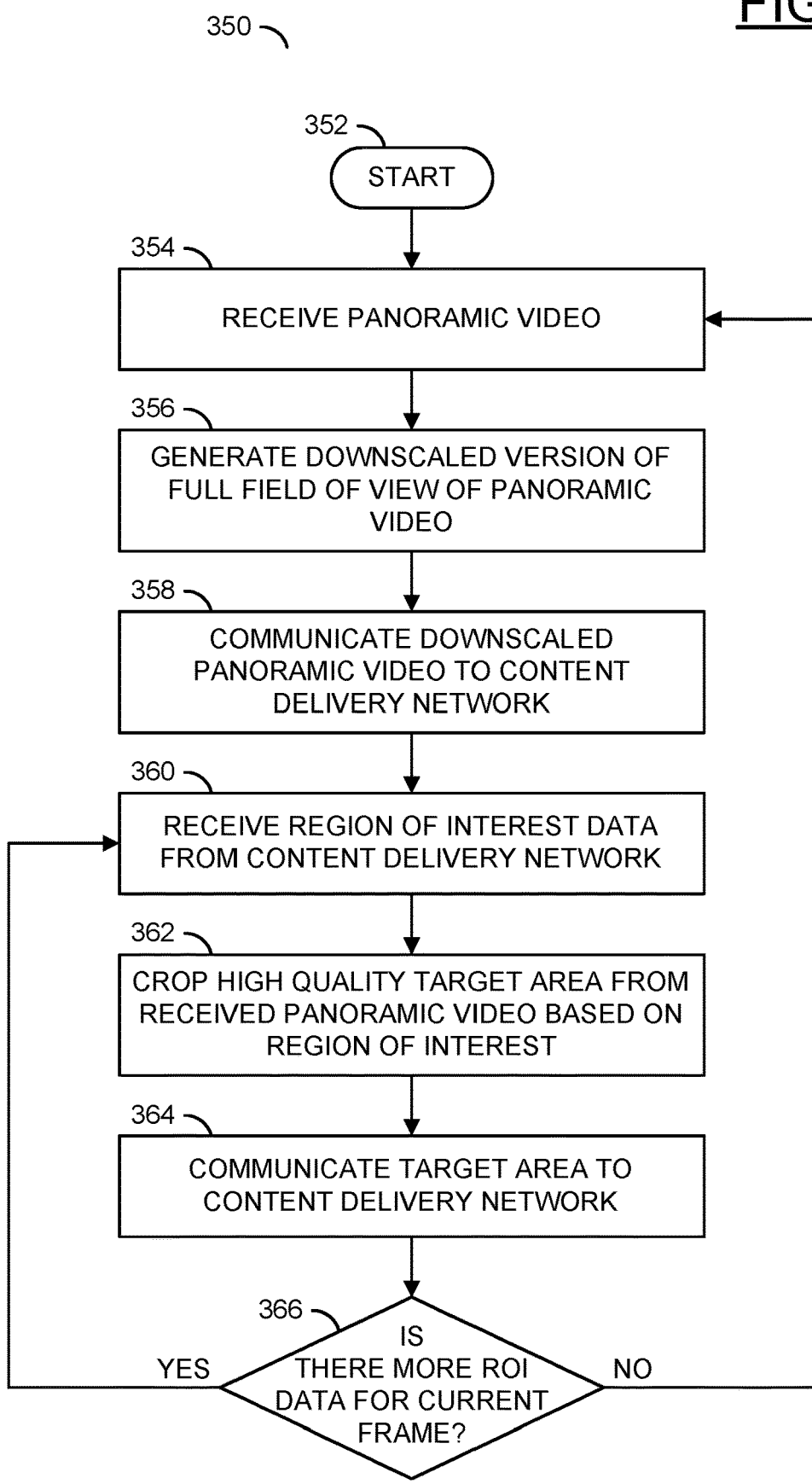
FIG. 11 is a flow diagram illustrating a method for generating target areas corresponding to regions of interest from multiple playback devices.

Referring to FIG. 11, a method (or process) 350 is shown. The method 350 may generate target areas corresponding to regions of interest from multiple playback devices. The method 350 generally comprises a step (or state) 352, a step (or state) 354, a step (or state) 356, a step (or state) 358, a step (or state) 360, a step (or state) 362, a step (or state) 364, and a decision step (or state) 366.

The state 352 may start the method 350. In the state 354, the processor 100 may receive the panoramic video 108 via the input interface 105. Next, in the state 356, the processor 100 may be configured to generate the downscaled version of the full field of view of the panoramic video 108 (e.g., generate the signal FFOV). In the state 358, the processor 100 may communicate the downscaled panoramic video FFOV to the content delivery network 70*a*-70*n* via the output interface 104*a*-104*n*. Next, in the state 360, the processor 100 may receive the current region of interest data CROI_A-CROI_N (e.g., generated by the playback devices 54*a*-54*n*) from the content delivery network 70*a*-70*n* via the input interfaces 106*a*-106*n*.

In the state 362, the processor 100 may crop a high quality target area from the received panoramic video 108 based on the region of interest data (e.g., the signal CROI_I generated by the playback device 54*i*). Next, in the state 364, the processor 100 may communicate the target area (e.g., TAR_I) to the content delivery network 70*a*-70*n*. For example, each target area may be generated in response to the current region of interest data received from one of the playback devices 54*a*-54*n*. Next, the method 350 may move to the decision state 366. In the decision state 366, the processor 100 may determine whether there is more region of interest data (e.g., more of the signals CROI_A-CROI_N)

for the current video frame of the panoramic video 108. If there is not more region of interest data, the method 350 may return to the state 354. If there is more region of interest data, the method 350 may return to the state 360.

Figure 12:
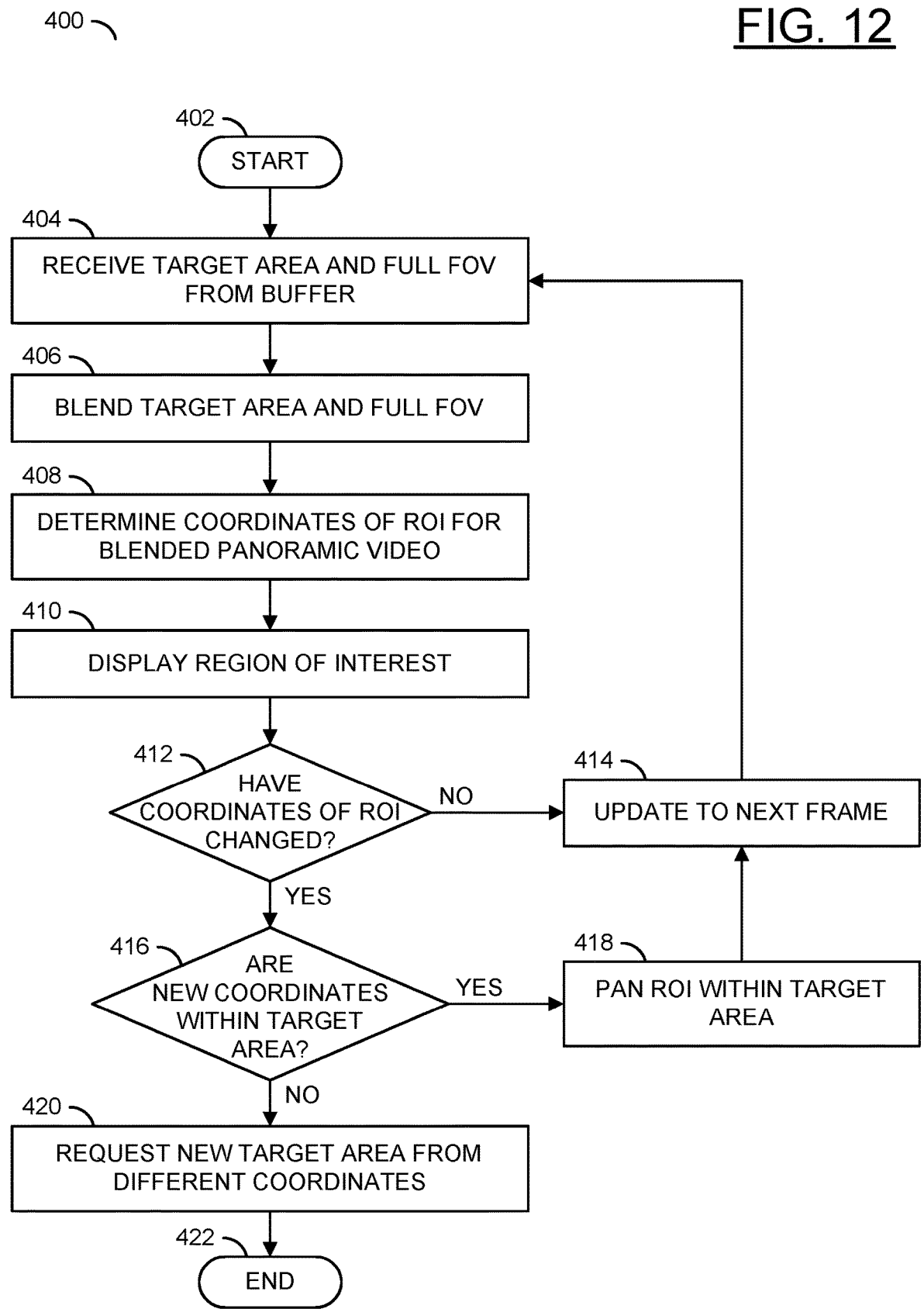
FIG. 12 is a flow diagram illustrating a method for panning a region of interest within a target area of a panoramic video frame.

Referring to FIG. 12, a method (or process) 400 is shown. The method 400 may pan a region of interest within a target area of a panoramic video frame. The method 400 generally comprises a step (or state) 402, a step (or state) 404, a step (or state) 406, a step (or state) 408, a step (or state) 410, a decision step (or state) 412, a step (or state) 414, a decision step (or state) 416, a step (or state) 418, a step (or state) 420, and a step (or state) 422.

The state 402 may start the method 400. In the state 404, the video processor 162 of the playback device 54i may receive the target area (e.g., TAR_I) and the downscaled panoramic video FFOV from the buffer 160. Next, in the state 406, the video processor 162 may blend the target area TAR_I with the upscaled panoramic video UFFOV (e.g., generate the signal VIDEO).

In the state 408, the playback device 54i may determine the coordinates for the current region of interest for the blended panoramic video signal VIDEO (e.g., based on measurements from a gyroscope, measurements from an inertial measurement unit, data from a software interface, etc.). Next, in the state 410, the playback device 54i may display the region of interest (e.g., output the signal VIDEO to the end user via the display interface 158). Next, the method 400 may move to the decision state 412.

In the decision state 412, the playback device 54i may determine whether the coordinates of the region of interest have changed. For example, the headset 54a may determine if the user has moved his or her head. In another example where the tablet computing device 54b is implemented, the software interface may determine whether the end user has moved the region of interest (provided a swipe input to move the region of interest). If the playback device 54i has not detected that the region of interest coordinates have changed, the method 400 may move to the state 414. In the state 414, the playback device 54i may update to the next frame of the signal VIDEO. Next, the method 400 may return to the state 404. In the decision state 412, if the playback device 54i has detected that the region of interest coordinates have changed, the method 400 may move to the decision state 416.

In the decision state 416, the playback device 54i may determine whether the new (e.g., updated) region of interest coordinates are within the target area TAR_I (e.g., whether the coordinates are still in the region of interest 124 and/or the additional area 122). If the new coordinates are within the target area TAR_I, the method 400 may move to the state 418. In the state 418, the video processor 162 may pan the region of interest within the target area TAR_I (e.g., continue playing the portion of the signal VIDEO having the higher visual quality). Next, the method 400 may move to the state 414. In the decision state 416, if the new coordinates are not within the target area TAR_I, the method 400 may move to the state 420. In the state 420, the playback device 54i may request a new target area from the content delivery network 70a-70n corresponding to different coordinates of the panoramic video 108 (e.g., generate the signal CROI_I). For example, the playback device 54i may playback the portion of the signal VIDEO having a lower visual quality until the updated target area is received. Next, the method 400 may move to the state 422. The state 422 may end the method 400.

The functions and structures illustrated in the diagrams of FIGS. 1 to 12 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
an interface configured to (a) receive a panoramic video stream generated by stitching signals received from a plurality of capture devices, (b) receive a set of coordinates corresponding to a direction a user of said apparatus is looking, (c) present a plurality of encoded target areas to a content delivery network and (d) present a downscaled panoramic video stream to said content delivery network; and
a processor configured to (a) generate a plurality of target areas in said direction said user of said apparatus is looking by cropping sections of said panoramic video stream that was generated by stitching the signals from the plurality of capture devices and received from said interface, (b) encode each of said target areas using first parameters, (c) use second parameters to encode said panoramic video stream to generate said downscaled panoramic video stream and (d) present said encoded target areas and said downscaled panoramic video stream to said interface, wherein (i) encoding using said first parameters generates a different bitrate than using said second parameters, (ii) said plurality of target areas cover an entire field of view of said panoramic video stream, (iii) each of said plurality of target areas covers a different position of said panoramic video stream, and (iv) said content delivery network presents to a playback device (a) one of said encoded target areas corresponding to a region of interest of said playback device and (b) said downscaled panoramic video.

2. The apparatus according to claim 1, wherein a field of view of a first of said plurality of target areas overlaps a field of view of at least a second of said plurality of target areas.

3. The apparatus according to claim 1, wherein said playback device communicates said set of coordinates to said content delivery network to request said encoded target areas corresponding to said region of interest of said playback device.

4. The apparatus according to claim 1, wherein said playback device comprises at least one of a wearable headset, a tablet computing device, a smartphone, a media device, a television, a laptop computer and a desktop computer.

5. The apparatus according to claim 1, wherein said apparatus is configured to broadcast to multiple endpoints.

6. The apparatus according to claim 1, wherein a best match is selected from said plurality of target areas for said playback device based on said region of interest of said playback device.

7. The apparatus according to claim 1, wherein a first of said plurality of target areas is presented to said playback device and a second of said plurality of target areas is presented when said region of interest of said playback device is changed beyond a pre-defined threshold.

8. The apparatus according to claim 1, wherein said apparatus is implemented as part of a server.

9. The apparatus according to claim 8, wherein said server is configured to scale on demand.

10. The apparatus according to claim 1, wherein encoding using said second parameters results in a compression configured to reduce a bandwidth consumption when transmitting said encoded panoramic video stream.

11. The apparatus according to claim 1, wherein (i) said downscaled panoramic video and said target area are transmitted to said playback device as two streams and (ii) said playback device views either said downscaled panoramic video or said target area.

12. The apparatus according to claim 1, wherein said playback device (i) receives said downscaled panoramic video stream, (ii) receives said target area, (iii) upscales said downscaled panoramic video stream and (iv) blends said target area with said upscaled panoramic video stream.

13. A method for broadcasting panoramic video comprising the steps of:
(A) receiving a panoramic video stream generated by stitching signals from a plurality of capture devices;
(B) receiving a set of coordinates corresponding to a direction a user is looking;
(C) generating a plurality of target areas in said direction said user is looking by cropping sections of said panoramic video stream that was generated by stitching the signals from the plurality of capture devices;
(D) encoding each of said plurality of target areas using first parameters;
(E) using second parameters to encode said panoramic video stream to generate a downscaled panoramic video stream; and
(F) presenting (i) each of said encoded target areas to a content delivery network and (ii) said downscaled panoramic video stream to said content delivery network, wherein (a) encoding using said first parameters generates a different bitrate than using said second parameters, (b) said plurality of target areas cover an entire field of view of said panoramic video stream, (c) each of said plurality of target areas covers a different position of said panoramic video stream, and (d) said content delivery network presents to a playback device (a) one of said encoded target areas corresponding to a region of interest of said playback device and (b) said downscaled panoramic video.

14. A method for broadcasting panoramic video comprising the steps of:
(A) receiving a panoramic video stream generated by stitching signals from a plurality of capture devices;
(B) receiving a set of coordinates corresponding to a direction a user is looking;
(C) receiving a plurality of region of interest data each corresponding to a respective playback device of a plurality of playback devices;
(D) selecting a target area of said panoramic video stream that was generated by stitching the signals from the plurality of capture devices, in response to each of said plurality of region of interest data, wherein (a) said target area is one of a plurality of target areas and (b) said plurality of target areas cover an entire field of view of said panoramic video stream;
(E) encoding each of said selected target areas using first parameters;
(F) using second parameters to encode said panoramic video stream to generate a downscaled panoramic video stream; and
(G) presenting (i) said encoded target area corresponding to said respective playback device and (ii) said downscaled panoramic video stream to each of said playback devices, wherein (a) encoding using said first parameters generates a different bitrate than using said second parameters and (b) each of said selected target areas is cropped from said panoramic video stream to correspond to said region of interest data from said respective playback device of said plurality of playback devices.

* * * * *